United States Patent [19]
Nguyen et al.

[11] Patent Number: 5,536,764
[45] Date of Patent: Jul. 16, 1996

[54] CATIONIC STARCH/VINYL ACETATE CONTAINING BOARD COATING BINDERS

[75] Inventors: Charles C. Nguyen; D. Eric Tupper, both of Cedar Rapids, Iowa

[73] Assignee: Penford Products Company, Cedar Rapids, Iowa

[21] Appl. No.: 287,166

[22] Filed: Aug. 8, 1994

Related U.S. Application Data

[63] Continuation of Ser. No. 901,073, Jun. 19, 1992, Pat. No. 5,360,846.

[51] Int. Cl.$^6$ .............................. C08L 3/00; C08L 89/00; C08L 5/16; C08F 8/00
[52] U.S. Cl. .............................. 524/53; 524/47; 524/48; 524/49; 524/50; 524/51; 526/238.22
[58] Field of Search .............................. 524/47, 48, 49, 524/50, 51, 53; 527/300; 526/238.22

[56] References Cited

U.S. PATENT DOCUMENTS

| | | | |
|---|---|---|---|
| 2,996,462 | 8/1961 | Robbins | 524/53 |
| 3,052,561 | 9/1962 | Kronfeld | 106/213 |
| 3,598,623 | 8/1971 | Powers et al. | 106/214 |
| 3,654,263 | 4/1972 | Cescato | 260/233.3 R |
| 3,706,584 | 12/1972 | Cescato | 160/214 |
| 3,884,853 | 3/1975 | Zimmerman | 524/47 |
| 4,010,307 | 3/1977 | Canard et al. | 524/53 |
| 4,146,515 | 3/1979 | Buikema et al. | 206/9 |
| 4,301,017 | 11/1981 | Kightlinger et al. | 252/8.6 |
| 5,130,394 | 7/1992 | Nguyen et al. | 527/300 |

FOREIGN PATENT DOCUMENTS

| | | |
|---|---|---|
| 283824 | 9/1988 | European Pat. Off. ............... 527/300 |
| 1449719 | 8/1966 | France . |
| 58-185640 | 10/1983 | Japan . |
| 59-30827 | 2/1984 | Japan . |
| 1412422 | 11/1975 | United Kingdom . |

OTHER PUBLICATIONS

Greif, *Tappi*, Cationic Starches as Paper Coating Binders, vol. 43, No. 3, 254–260 (1960).
Mazarella et al., *Tappi*, Development of Cationic Starches as Paper Coating Binders, vol. 49, No. 12, pp. 526–532 (1966).
Rutenberg et al., *Starch Derivatives: Production and Uses*, pp. 355–388.

*Primary Examiner*—Paul R. Michl
*Assistant Examiner*—LaVonda R. DeWitt
*Attorney, Agent, or Firm*—Marshall, O'Toole, Gerstein, Murray & Borun

[57] ABSTRACT

Board coating compositions are provided comprising a cationic starch and a vinyl acetate polymerization product as protein binder substitutes.

4 Claims, No Drawings

CATIONIC STARCH/VINYL ACETATE CONTAINING BOARD COATING BINDERS

This is a Continuation of U.S. application Ser. No. 07/901,073, now U.S. Pat. No. 5,360,846 filed Jun. 19, 1992.

BACKGROUND OF THE INVENTION

The present invention relates generally to board coating compositions and specifically to binders for paperboard which comprise a cationic starch and a vinyl acetate polymerization product. More specifically, the invention provides binder materials in which vinyl acetate grafted starch dispersions and blends of cationic starch and polyvinyl acetate are used to replace protein typically used in such formulations.

Compositions for coating of paperboard are well known in the art and comprise a pigment component, a binder component and miscellaneous components such as lubricants, dispersants, defoamers, biocides and preservatives. Pigments useful for board coatings are similar to those useful for paper coating and typically include materials such as clays, calcium carbonate, titanium dioxide as well as colored pigments. While binder components for paper coating compositions generally comprise starch and/or latex, board coating compositions typically require greater pigment binding strength than can be provided by starch and/or latex alone. Accordingly, board coating binder compositions additionally comprise protein, such as soy protein or casein, as a binder, to improve binding strength sufficiently for the coated board to be useful in the manufacture of boxes, cartons and other items. The incorporation of protein into the board coating binder compositions provides sufficient pigment binding strength to those compositions to improve the strength properties of the coating as measured by glueability tests which measure the ability of one coated substrate to adhere to another coated or uncoated substrate. Unfortunately, protein is relatively costly and is difficult to handle since it requires a substantial cooking step before it can be used in the coating. Accordingly, there is a desire in the art to replace protein with a less costly binder component which does not have the protein cooking requirement.

Of interest to the present application is the observation that cationic starch is generally undesirable for use as a binder component in a paperboard coating composition because of the tendency of the cationic starch to floc clay.

Japan patent Sho 58 (1983)-185640 and Sho 59 (1984)-30827 disclose redispersible powders prepared by adding cationic compounds including cationic starch to nonionic or weakly ionic vinyl-type aqueous polymer emulsions or prepared by emulsion-polymerization of vinyl monomers including vinyl acetate in a system where cationic group containing compounds such as cationic starch or cationic polyvinyl alcohol are introduced.

Japan patent Sho 55 (1980)-12867 discloses a process of producing vinyl alcohol grafted starch utilizing the oxidized granular, tapioca and acid treated starches as the starting materials. Vinyl acetate was grafted to these starch granules at 40° C. using a variety of initiators such as ceric salts, ammonium persulfate and hydrogen peroxide. The vinyl acetate grafted starches were saponified with sodium hydroxide and sodium hypochlorite. The saponified products were used in paper surface sizing applications.

Buikema et al., U.S. Pat. No. 4,146,515 discloses the use of cationic starch as a paper sizing material.

Kronfeld, U.S. Pat. No. 3,052,561 discloses the use of cationic starch derivatives as a partial or complete replacement for starch used in a paper coating binder. The patent further discloses that the cationic starches may be used in conjunction with (or in complete replacement of) other binders such as synthetic resins or latices.

Powers et al., U.S. Pat. No. 3,598,623 disclose carboxyl starch amine ethers wherein the anionic substituent to amine-ether substituent molar ratio is at least 1:1 and is preferably between about 1.1:1 and about 3:1. The starch amine has an average of from about 0.75 to about 5 amine ether substituents per 100 anhydro-glucose units which is a cationic degree of substitution (D.S.) of from about 0.0075 to about 0.05. The net negatively charged amphoteric carboxyl starch amine ethers are disclosed to be suitable for use as the sole binder ingredient in coating color compositions or for use in combination with one or more other binder materials such as a starch casein, polyvinyl alcohol, or a synthetic polymer latex including styrene-butadiene copolymer, ethylene-vinyl acetate copolymer, acrylate copolymer and vinyl acetate polymer.

Cescato, U.S. Pat. Nos. 3,654,263 and 3,706,584 disclose a cationic starch derivative with a cationic degree of substitution of from about 0.1 to about 0.01 which is oxidized to introduce carboxyl groups in sufficient quantity that the ratio of the percentage of the carboxyl groups by weight, dry basis, to the degree of substitution with the cationic-type substituent is at least 1 to 1. The oxidized cationic starch derivatives are disclosed to be useful as binders in paper coating color compositions and a stated object of the patents is to provide properties that approach those of casein for paper coating applications.

Rutenberg et al., Starch Derivatives: Production and Uses, pp. 355–388, disclose at page 363, the use of cationic starch as a paper coating binder offering increased strength due to electrochemical binding of clay to fiber. The publication notes that if the amino content is too high, agglomeration or coagulation of the clay can occur.

Mazzarella et al., TAPPI, Vol. 49, pp. 526–532 (1966), disclose the use of cationic starches as substitutes for casein in paper coating binder systems. Synthetic latices including polyvinyl acetate, styrene-butadiene and acrylic latices are suggested for use as cobinders with the cationic starch but no suggestion is made that a cationic starch/vinyl acetate product would have properties suitable for use as a board coating binder.

SUMMARY OF THE INVENTION

The present invention relates generally to board coating compositions and specifically to binders for board coating compositions comprising a cationic starch and a vinyl acetate polymerization product. More specifically, the invention provides binder compositions in which cationic starch and a vinyl acetate polymerization product function to replace some or all of the protein present in such combinations. It has been found that the combination of cationic starch and a vinyl acetate polymerization product provides enhanced strength and glueability properties to board coatings and functions as a suitable replacement for proteins such as soy protein and casein in board coating binders. The cationic starch/vinyl acetate product cannot only replace the protein component of a board coating binder composition, but can additionally replace the synthetic latex (typically styrenebutadiene rubber) portion of the binder. The board coatings and board coating binders of the invention can be used for both base coating and top coating of paperboard.

The invention provides board coating compositions comprising pigment such as clay, titanium dioxide, calcium carbonate and the like, and a binder comprising a cationic starch and a vinyl acetate polymerization product. The binder can comprise either blends of cationic starch and vinyl acetate polymerization products, or preferably the reaction product of cationic starch and vinyl acetate monomer such as a graft copolymer of cationic starch and one or more monomers including vinyl acetate. Where the binder comprises a reaction product of cationic starch and vinyl acetate monomer, it is preferably the product of a persulfate ion initiated reaction.

A wide variety of cationic starches including dual derivative cationic starches are suitable for use with the invention with thinned starches, particularly enzyme thinned starches being preferred. Preferred dual derivative cationic starches for use with the invention include $C_1-C_6$ hydroxy-lower alkyl cationic starches with hydroxyethyl cationic starch and hydroxypropyl cationic starch being preferred. The cationic starches used according to the invention preferably have a cationic degree of substitution of from about 0.01 to about 3.0 with from about 0.01 to about 0.20 being preferred. More than one type of cationic starch can be combined to make up the board coating binder compositions of the invention. Amphoteric starches having both positive and negative charges may be used according to the invention provided they have a net positive (cationic) charge. The weight ratio of vinyl acetate component to the cationic starch component of the board coating binder compositions is preferably from about 20:100 to about 300:100 with from about 60:100 to about 100:100 being most preferred. The cationic starch and vinyl acetate polymerization product preferably comprise from about 1% to about 30% by weight of the board coating compositions of the invention with from about 5% to about 20% being particularly preferred.

As an additional aspect of the invention, it has been discovered that dual derivative cationic starches produced by cationic derivatization followed by derivatization by a second derivatization or vice versa are not only useful as board coating binders in combination with vinyl acetate polymerization products, but are useful alone as substitutes for protein in board coating binders. Preferred dual derivative cationic starches according to this aspect of the invention are hydroxy-lower alkyl cationic starches with lower alkyl defined as $C_1-C_6$ alkyl. Particularly preferred for use alone as protein binder substitutes are hydroxyethyl and hydroxypropyl cationic starches.

The board coating binder compositions of the invention can comprise a wide variety of components in addition to cationic starch and a vinyl acetate polymerization product. Such components can include synthetic polymer latices such as styrene/butadiene latex. According to one embodiment of the invention, cationic and anionic charged monomers may be reacted with cationic starch and vinyl acetate monomer to produce a reaction product. Preferred cationic charged monomers include 4-vinyl pyridine, dimethylaminopropyl methacrylamide, methacrylamidopropyl trimethylammonium chloride, N,N-dimethylaminoethyl methacrylate and 2-trimethylammonium ethylmethacrylate chloride. Preferred anionic charged monomers include acrylic acid, maleic anhydride, maleic acid, fumaric acid and itaconic acid. The board coating binder compositions of the invention can comprise protein but the presence of protein is generally rendered unnecessary by the cationic starch/polyvinyl acetate compositions of the invention.

The invention also provides methods of coating paperboard with the board coating compositions of the invention. Preferred coating methods include those wherein the board coating composition is applied at a level of from about 0.5 to about 10 pounds per 1000 square feet.

DESCRIPTION OF THE INVENTION

Suitable starch Materials

Cationic starch materials useful according to the present invention may be derived from practically all starches of plant origin including starches from dent corn, waxy corn, high amylose containing corn, potato, wheat, rice, tapioca, sago and sorghum with starches from corn and potato being preferred. Suitable starches include starches thinned by acid hydrolysis, oxidative hydrolysis, enzymatic or thermal degradations as well as thin natural polysaccharide materials such as dextrins, maltodextrins, chemically substituted maltodextrins and enzyme thinned maltodextrins. A variety of starch derivatives may also be used including starch ethers and starch esters with hydroxyalkyl starch ethers such as hydroxyethyl and hydroxypropyl starch ethers being particularly preferred.

Cationic starch derivatives useful with the present invention are prepared according to methods which are well known in the art by reacting starch, ordinarily through an etherification or esterification process, with a reagent containing a group containing an amine or other cationic substituents. Descriptions of such methods are provided in "Productions and Uses of Cationic Starches" by E. F. Paschall in Starch: Chemistry and Technology, ed. by R. L. Whistler and E. F. Paschall, Vol. II, p. 403–422, Academic Press (1967); "Starch Derivatives: Production and Uses" by M. W. Rutenberg and D. Solarek in Starch: Chemistry and Technology, 2nd Edition, ed. by R. L. Whistler, J. N. Bemiller and E. F. Paschall, chapter X, p. 354–361, Academic Press (1984); and "Cationic Starches" by D. B. Solarek in Modified Starches: Properties and Uses, ed. by O. B. Wurzburg, Chapter 8, p. 113–129, CRC Press (1986).

Suitable cationic substituents include primary, secondary, tertiary and quaternary amines; sulfonium and phosphonium groups. Preferred substituents are tertiary and quaternary amines such as 2-diethylaminoethyl chloride, 2-dimethylaminoethyl chloride, 2-dimethylaminoisopropyl chloride, 2-diallylaminoethyl chloride, 2-diisopropylaminoethyl chloride, N-(2,3-epoxypropyl) diethylamine, N-(2,3-epoxypropyl)dibutylamine, N-(2,3-epoxypropyl)-N-methylaniline, N-(2,3-epoxypropyl) piperidine, 3-chloro-2-hydroxypropyl diethylamine, (4-chlorobutene)-2-trimethylammonium chloride, 2,3-(epoxypropyl) trimethylammonium chloride, 2,3-(epoxypropyl) triethylammonium chloride, 3-chloro-2-hydroxypropyl trimethylammonium chloride, 3-chloro-2-hydroxypropyl triethylammonium chloride.

Dual cationic starch derivatives may be produced by cationic derivatization followed by derivatization with a second derivative or vice versa, and include cationic/anionic starches, anionic/cationic starches, nonionic/cationic and cationic/nonionic substituted starches. The methods for the preparation of these dual starch derivatives are well known in the art and are described in the above-identified references. The dual starch derivatives are prepared by reacting the starch with the substituent reagents sequentially or simultaneously. The introduction of the anionic charge to the starch can be done by either treating starch with hydrolyzing and/or oxidizing agents such as hydrochloric acid, sulfuric acid, nitric acid, sodium hypochlorite, potassium persulfate, ammonium persulfate, or by reacting starch with anionic substituent reagents containing carboxyl, sulfonate, sulfate, phosphate, phosphonate and xanthate groups. The preferred anionic substituent reagents are chloroacetic acid, chloroacetic acid sodium salt, maleic acid, maleic anhydride, 3-chloro-2-hydroxy-1-propanesulfonic acid sodium salt, propane sulfone, sulfur trioxide trimethylamine complex, sodium monohydrogen phosphate, sodium dihydrogen phosphate and diethylvinylphosphonate. The nonionic substituted starch can be produced by reacting starch with nonionic reagents such as ethylene oxide, propylene oxide, vinyl acetate, ketene, alkyl halides, allyl halides, benzyl halides, dimethyl sulfate, long chain hydrocarbon anhydrides, methyl acrylate, acrylonitrile and acrylamide.

Vinyl Acetate Polymerization Products

Vinyl acetate polymerization products suitable for use in combination with cationic starch according to the invention include polyvinyl acetate polymers such as are commercially available and which can be used in blends with cationic starch. In addition, vinyl acetate monomer can be polymerized in the presence of cationic starch to form a reaction product having properties suitable for use as a board coating. Reaction products include, but are not limited to, graft copolymers of polyvinyl acetate and cationic starch. Blends and reaction products can further comprise a wide variety of comonomers such as N-methylol acrylamide, divinyl benzene, butyl acrylate, acrylic acid, 4-vinyl pyridine and other monomers as would be apparent to those of skill in the art.

Suitable initiators for such polymerization and grafting reactions include organic and inorganic peroxy compounds, azo compounds and persulfate compounds. Hydrogen peroxide and persulfate ion free radical initiators are preferred with potassium persulfate being particularly preferred.

EXAMPLES

In the following examples, the cooked starches were first grafted with vinyl acetate monomer (VAc) using a potassium persulfate (KP) initiator. The resulting dispersions were used to replace the protein as a binder in paperboard coating compositions. Starches used in the examples were classified into three groups: ionic starches which exhibit either cationic or anionic charged characters; amphoteric starches which have both anionic and cationic charged characters; and starches which do not have charged characters and are known as nonionic starches.

Example 1

This example illustrates the preparation of vinyl acetate grafted starch dispersions using ionic starches as the starting materials, which include Apollo® 500 (a cationic corn starch having a cationic degree of substitution (D.S.) of 0.03, Penford Products Co. Cedar Rapids, Iowa), Apollo® 700 (a cationic corn starch having a cationic D.S. of 0.05, Penford Products Co.), cationic corn starch with D.S. of 0.10 prepared in the laboratory, Astro® X-200 (a cationic potato starch having a cationic D.S. of 0.03, Penford Products Co.), Astro® X-101 (a cationic potato starch having a cationic D.S. of 0.04, Penford Products Co.), Astro® X-50 (a cationic potato starch having a cationic D.S. of 0.05, Penford Products Co.), and Astro®21 (an anionic corn starch having an anionic D.S. of 0.03, Penford Products Co.).

A cationic corn starch with cationic D.S. of 0.1 was prepared as follows: Into, a 5 liter plastic beaker containing a mixture of isopropanol (1833 g) and water (535 g), an unmodified corn starch (1296 g dry, at 10.6% moisture) was slowly added with stirring. The starch slurry was mechanically stirred for 10 minutes to insure the homogeneity, then 500 g of 10% aqueous NaOH solution was slowly and carefully added to the starch slurry with vigorous agitation. After the addition of NaOH, 185 g of 2,3-epoxypropyl trimethylammonium chloride (Quab 151®, 72% epoxide, from Degussa Corp., Theodore, Ala.) was slowly added. The reaction vessel was closed and the temperature was brought to 45° C. with sufficient agitation to prevent settling. The starch reaction was carried out at 45° C. for 24 hours. The resulting starch suspension was cooled to room temperature and neutralized to pH 7.0 with $H_2SO_4$/ethanol mixture (50/100 by volume). The starch was then dewatered on a suction filter. The starch filter cake was reslurried in 3 liters of ethanol/water (80/20 by volume) and filtered. This process was repeated several times until all of the salt and unreacted monomer were removed. The starch filter cake was crumbled and dried at room temperature to 13% moisture content. The dried starch crumb was ground in a Raymond mill and stored in a plastic bag. The solids of the cationic starch were 87.0% as determined with a Mettler Infrared drying unit, model LP16-M. Nitrogen content from cationic substituent was analyzed using Kjeldahl nitrogen analysis procedure described in the Standard Analytical Methods of the Member Companies of Corn Refiners Association, Inc., Third Edition, Number B-48. The nitrogen content of 0.78% was obtained. That was calculated into a degree of substitution (D.S.) of 0.10 using a following formula:

$$D.S. = \frac{(162)\,(\%\ \text{nitrogen})}{(100)\,(14) - (A)\,(\%\ \text{nitrogen})}$$

where A is molecular weight of the nitrogen containing radical (in this case A=117). A reaction efficiency of 88.2% was also obtained.

The ionic starch used in the vinyl acetate grafting was first enzyme thinned and cooked to a solids of 30%. The cooked starch paste was then grafted with vinyl acetate at the monomer/starch ratios of 60/100, 80/100 and 100/100 (parts/parts) using potassium persulfate initiator at a level of 2% based on monomer. Grafting reaction was carried out in the presence of sodium bicarbonate buffer (used at 1% of monomer weight) for nine hours at a maximum temperature of 80° C. A final dispersion solids was targeted at 40% solids. A detailed description of the enzyme thinning and grafting procedures is demonstrated as follows in which Apollo® 700 is taken as an example.

(1) Enzyme Thinning of Starch

A starch slurry at 40% solids containing 1000 g dry of Apollo® 700 starch and 140 microliters of alpha-amylase (Taka Therm L-170® from Solvay Co.) was slowly added for 20 minutes to a bench starch cooker which contains 833 ml of water at 95° C. with vigorous agitation. The starch was further thinned for 10 minutes, and the temperature was dropped down to 90° C., then 5 ml of sodium hypochlorite solution (K. A. Steel Chemicals Inc.) was added to stop the enzymatic reaction. The starch was further cooked at 90° C. for 15 more minutes. The enzyme thinned and cooked starch paste was cooled to 25° C. (Brookfield viscosity of thinned and cooked starch is 6450 cps using spindle No. 4, at 20 rpm) and transferred to a reaction vessel (Parr Instrument) for grafting.

(2) Grafting Reaction

To a 2 liter Parr reactor which contained 450 g dry basis of enzyme thinned, cooked Apollo® 700 starch paste; 270 g of vinyl acetate (used at monomer/starch ratio of 60/100), 5.4 g of potassium persulfate powder and 2.7 g of sodium bicarbonate powder were added. An additional amount of water (42.15 g) was then added to makeup a total solids of 40%. The reaction vessel was closed and stirred at 600 rpm at room temperature for 15 minutes. The agitation was then reduced to 500 rpm and the reactor contents were heated up to 80° C. for one hour and maintained at that temperature for seven hours. The reaction mixture was cooled to 30° C. for one hour. The final vinyl acetate grafted starch dispersion was screened through a 100 mesh sieve and stored in a plastic container at room temperature.

The grafted starch dispersion had a solids of 38.4%, was off-white and very smooth, and no coagulum remained on the sieve. The Brookfield viscosity at 25° C. with spindle No. 1 at 10 rpm was 700 cps, and a particle size of 288 nanometers was measured with a BI-90 Particle Sizer (Brookhaven Instruments Corp.). Table 1 shows the physical properties of the ionic starches grafted with vinyl acetate at various levels of monomer/starch ratios: 60/100, 80/100 and 100/100.

TABLE 1

Physical Properties of Vinyl Acetate Grafted Ionic Starch Dispersions

| Sample | Ionic D.S. | Monomer/ Starch Ratio | Dispersion Solids (%) | Spindle No. | RPM | Visc. (cps) | Particle Size (nm) |
| --- | --- | --- | --- | --- | --- | --- | --- |
| E.T. Apollo ® 500/ Vinyl Acetate | 0.03 cationic | 60/100 | 38.0 | 1 | 10 | 600 | 332 |
| | | 80/100 | 38.8 | 3 | 50 | 560 | 406 |
| | | 100/100 | 39.3 | 1 | 10 | 350 | 454 |
| E.T. Apollo ® 700/ Vinyl Acetate | 0.05 cationic | 60/100 | 38.4 | 1 | 10 | 700 | 288 |
| | | 80/100 | 39.0 | 3 | 50 | 540 | 369 |
| | | 100/100 | 38.3 | 1 | 10 | 270 | 387 |
| E.T. Cat. Corn/ Vinyl Acetate | 0.10 cationic | 100/100 | 39.9 | 3 | 100 | 290 | 392 |
| E.T. Astro ® X-200/ Vinyl Acetate | 0.03 cationic | 60/100 | 38.8 | 3 | 100 | 260 | 542 |
| | | 80/100 | 39.5 | 3 | 100 | 240 | 562 |
| | | 100/100 | 38.8 | 3 | 100 | 150 | 552 |
| E.T. Astro ® X-101/ Vinyl Acetate | 0.04 cationic | 60/100 | 40.4 | 3 | 100 | 470 | 471 |
| | | 80/100 | 41.1 | 3 | 50 | 520 | 577 |
| | | 100/100 | 38.4 | 3 | 100 | 210 | 581 |
| E.T. Astro ® X-50/ Vinyl Acetate | 0.05 cationic | 60/100 | 30.8 | 3 | 50 | 1780 | 338 |
| | | 100/100 | 29.6 | 3 | 50 | 880 | 339 |
| E.T. Astro ® 21/ Vinyl Acetate | 0.03 anionic | 60/100 | 39.0 | 1 | 20 | 265 | 411 |
| | | 100/100 | 38.7 | 2 | 20 | 320 | 503 |

D.S. = degree of substitution
E.T. = enzyme thinned.

Example 2

This example describes a procedure for determining the grafting efficiency of the vinyl acetate grafted starch dispersions and also the ratio of extractable monomer(s) and polymer(s) to unextractable solids comprising grafted starch.

According to the procedure, 10 g dry weight of the grafted product dispersion were diluted to 20% solids with water. The diluted dispersion was then freeze dried in a Lyph-Lock® freeze dry system (Labconco Corp.). The dried product was then extracted with benzene in a Soxhlet extractor to remove the monomer(s) and ungrafted polymer(s). The extraction was extended until the weight of extracted product remained unchanged (normally it took two to three days to complete the extraction). The extracted product was air dried and then oven dried at 115° C. for one day, and its weight was obtained. The dry weight of the product after extraction was used in the calculation of grafting efficiency and the ratio of extractable monomer(s)

and polymer(s) thereof/unextractable solids including the grafted starch, which are defined as follows:

T=dry weight of the grafted product before extraction

GS=dry weight of the unextractable solids

OS=dry weight of the starch before grafting

M=weight of monomer(s) used

Ad=dry weight of the additives used in the grafting reaction, i.e., initiator, buffer and surfactant, etc.

From these values, one can calculate:

Amount of extractable monomer(s) and polymer(s) thereof, UP: UP=T−GS

Amount of unextractable solids including grafted starch, GP: GP=GS−(OS+Ad)

Grafting efficiency, GE in percent: GE=(GP/M)×100

The ratio of extractable monomer(s) and polymer(s) thereof/unextractable solids, RA: RA=UP/GS The results of grafting vinyl acetate to lightly enzyme thinned ionic starches at various level of monomer/starch ratio are shown in Table 2.

TABLE 2

Grafting Efficiency of Vinyl Acetate Grafted Ionic Starches

| Sample | Ionic D.S. | Monomer/ Starch Ratio | Grafting Efficiency (%) | Extractable/ Unextractable Ratio |
|---|---|---|---|---|
| E.T. Apollo ® 500/ | 0.03 | 60/100 | 74.1 | 0.11 |
| Vinyl Acetate | cationic | 80/100 | 51.4 | 0.27 |
|  |  | 100/100 | 27.1 | 0.56 |
| E.T. Apollo ® 700/ | 0.05 | 60/100 | 63.4 | 0.16 |
| Vinyl Acetate | cationic | 80/100 | 41.8 | 0.34 |
|  |  | 100/100 | 32.9 | 0.49 |
| E.T. Cat. Corn/ | 0.10 | 100/100 | — | — |
| Vinyl Acetate | cationic |  |  |  |
| E.T. Astro ® X-200/ | 0.03 | 60/100 | 38.1 | 0.30 |
| Vinyl Acetate | cationic | 80/100 | 26.8 | 0.47 |
|  |  | 100/100 | 22.0 | 0.62 |
| E.T. Astro ® X-101/ | 0.04 | 60/100 | 30.1 | 0.35 |
| Vinyl Acetate | cationic | 80/100 | 36.5 | 0.39 |
|  |  | 100/100 | 19.2 | 0.66 |
| E.T. Astro ® X-50/ | 0.05 | 60/100 | — | — |
| Vinyl Acetate | cationic | 100/100 | — | — |
| E.T. Astro ® 21/ | 0.03 | 60/100 | — | — |
| Vinyl Acetate | anionic | 100/100 | — | — |

E.T. = enzyme thinned.

Example 3

This example illustrates the use of vinyl acetate grafted starch dispersions and of enzyme thinned cationic starch alone in replacing protein as a binder in paperboard coating. The cationic starch was a cationic corn starch (Apollo® 700) which was enzyme thinned and cooked at 30% solids according to the procedure of Example 1. The enzyme thinned cationic starch was not blended to or grafted with vinyl acetate but was used as a control to replace protein as a binder in a board coating composition.

The paperboard coating compositions (coating colors) which contain either a protein, vinyl acetate grafted starches or cationic starch were applied onto commercially available precoated (or base coated) paperboards. The resulting properties attributable to each coating composition were determined. A typical top coating formula used with the vinyl acetate grafted starches and the polyvinyl acetate-starch blends of the invention included:

| Composition | Dry Parts |
|---|---|
| Conventional Clay (Astra-Cote 90) | 50.2 |
| Calcined Clay (Alphatex) | 7.1 |
| TiO$_2$ (DuPont RPD) | 42.7 |
| Protein, vinyl acetate grafted starch, polyvinyl acetate starch blend, or starch alone | 7.2 |
| Carboxylated SBR latex (Dow 6669 NA) | 11.4 |
| Tetrasodium pyrophosphate | 0.14 |
| Dispersant (Colloids 211) | 0.27 |
| Biocide (Metasol D3T) | 0.02 |
| Defoamer (Pluronic L-62) | 0.36 |
| Final coating solids | 48% |
| pH of coating color (with NH$_4$OH) | 9–9.4 |
| Ammonium zirconium carbonate (Bacote 20) | 3.32 (as is) |

Preparation of Clay Slip

Into a plastic container, 811 g of water, 2.1 g dry of tetrasodium pyrophosphate (100% solids), 4.05 g dry of dispersant (43% solids) and 0.3 g dry of biocide (100% solids) were added. The mixture was thoroughly mixed for five minutes at 450 rpm with a Cowles blade mixer. While it was still in the mixer, 753 g dry of conventional clay (98.5% solids), 106.5 g dry of calcined clay (98.5% solids) and 640.5 g dry of TiO$_2$ (98.5% solids) were orderly added. The whole mixture (clay slip) was then mixed at 1400 RPM for further 30 minutes. The final solids of the resulting clay slip was 64.2%.

Protein Cooking

An amount of 168 g of water was preheated to 145°–150° F. in a steam cooker, then 30 g dry of soy protein (Pro-Cote 400® at 93.7% solids, from Protein Technologies International) was slowly added under good agitation, followed by 7.05 g of concentrated ammonium hydroxide. The addition of protein and ammonium hydroxide lowered the temperature to about 135° F. The temperature was held at 135°–140° F. for an additional 30 minutes to complete the cook. The cooked protein was cooled down to about 85°–90° F. and sufficient additional water was added to makeup a final solids of 15%.

Preparation of Coating Composition (Coating Color)

The control coating color which contains protein was prepared by mixing 24.1 g of water, 7.2 g dry of protein (at 15% solids), 0.36 g dry of defoamer (100% solids), 11.4 g dry of carboxylated SBR latex (48.5% solids) and 3.32 g of ammonium zirconium carbonate used as received. After the binder composition was thoroughly mixed, 100.43 g dry of clay slip (at 64.2% solids) was slowly added with good agitation. The final pH of the coating color was adjusted to 9.0–9.4 with ammonium hydroxide, if required, and a final solids of 48% was obtained.

In the preparation of coating compositions comprising vinyl acetate grafted starch dispersions, polyvinyl acetate-starch blends or cationic starch alone, the above preparation procedure was followed in which the protein was replaced with the vinyl acetate grafted starch dispersions, or polyvinyl acetate-starch blends, or cationic starch alone in equal dry weight. The final pH of 9.0 to 9.4 and solids of 48%, were obtained. The coating composition comprising cationic starch alone as a protein replacement flocced the clays.

Paperboard Coating

The finished coating colors were applied to commercially available precoated (base coated) paperboards at room temperature at about 0.9 to 6 lbs/1000 ft$^2$ per side using Meyer wirewound rods. All coated paperboards were immediately dried in an infrared dryer (CCR Enterprises) at a gauge temperature of 170° F. for one minute and then conditioned at 50% relative humidity and 75° F. for overnight. The coated paperboards were then tested for gloss and glueability without calendering. The coating composition comprising cationic starch alone as a protein replacement was unable to be coated because of flocculation of the clays.

Determination of the Gloss of Coated Paperboards

Gloss of the uncalendered coated paperboards was determined using a gloss meter (Glossgard® II, from Pacific Scientific Instrument). Five gloss readings were made on a coated board and three boards were used for each sample.

Glueability Test

The coated paperboard after conditioning was cut into sheets 6" by 12" long in the machine direction. Two specimens are used for each test.

Onto a coated side of one board specimen, a PVAc glue (Reynolds 186 Glue from Reynolds Company) was drawn down with a Meyer rod No. 30; then another coated paperboard specimen was immediately put on the top of the glued one with the coated sides facing each other (coated side glued to coated side). A 10 pound weighted plate 6"×12" in size was laid on the top of the board specimens. A timer was started and the test was run at 30 second intervals. At the end of the test time (which also called glue time), the weight was removed, the top specimen was pulled away with a 45° angle from the bottom specimen. The percent of fiber tear was recorded. A good result shows a higher percent of fiber tear for a shorter glue time.

The results of gloss and glueability tests of the coated paperboards containing coating compositions comprising protein or cationic starch alone as controls and the vinyl acetate grafted ionic starches are shown in Table 3.

TABLE 3

Coating Results of Paperboards Coated with Binder Vinyl Acetate Grafted Ionic Starch Dispersions

| Sample | Ionic Degree Subst. | Brookfield Viscosity at 48% Solids | | | Coat Wt. (lbs/ 1000 ft$^2$) | Glueability | | Uncalendered Gloss (%) |
|---|---|---|---|---|---|---|---|---|
| | | Spindle No. | RPM | Visc. (cps) | | Glue Time (min.) | % Fiber Tear | |
| Protein (Control) | n.a. | 3 | 20 | 400 | 2.60 | 0.5 | — | 23.6 |
| | | | 50 | 260 | | 1.0 | 50 | |
| | | | 100 | 180 | | 1.5 | 100 | |
| | | | | | 1.91 | 0.5 | — | 22.6 |
| | | | | | | 1.0 | 85 | |
| | | | | | | 1.5 | 97 | |
| | | | | | 1.40 | 0.5 | 0 | 22.5 |
| | | | | | | 1.0 | 90 | |
| E.T. Apollo ® 700 Only (Control) (Flocced, unable to coat) | 0.05 cationic | n.a. | n.a. | n.a. | n.a. | n.a. | n.a. | n.a. |
| E.T. Apollo ® 500/Vinyl Acetate Graft, 60/100 | 0.03 cationic | 2 | 100 | 68 | 1.96 | 0.5 | — | 24.3 |
| | | | | | | 1.0 | 50 | |
| | | | | | 1.5 | 65 | | |
| | | | | | 0.99 | 0.5 | 98 | 14.8 |
| | | | | | | 1.0 | 100 | |
| | | | | | | 1.5 | — | |
| E.T. Apollo ® 500/Vinyl Acetate Graft, 100/100 | 0.03 Cationic | 2 | 100 | 40 | 1.73 | 0.5 | — | 26.8 |
| | | | | | | 1.0 | 70 | |
| | | | | | | 1.5 | 85 | |
| | | | | | 0.98 | 0.5 | 98 | 13.5 |
| | | | | | | 1.0 | — | |
| | | | | | | 1.5 | — | |
| E.T. Apollo ® 700/Vinyl Acetate Graft, 60/100 | 0.05 Cationic | 2 | 50 | 220 | 1.99 | 0.5 | — | 25.2 |
| | | | | | | 1.0 | 60 | |
| | | | | | | 1.5 | 90 | |
| | | | | | 0.99 | 0.5 | 60 | 14.9 |
| | | | | | | 1.0 | 100 | |
| | | | | | | 1.5 | — | |
| E.T. Apollo ® | 0.05 | 2 | 20 | 120 | 1.91 | 0.5 | — | 24.7 |

TABLE 3-continued

Coating Results of Paperboards Coated with Binder Vinyl Acetate Grafted Ionic Starch Dispersions

| Sample | Ionic Degree Subst. | Brookfield Viscosity at 48% Solids | | | Coat Wt. (lbs/1000 ft²) | Glueability | | Uncalendered Gloss (%) |
|---|---|---|---|---|---|---|---|---|
| | | Spindle No. | RPM | Visc. (cps) | | Glue Time (min.) | % Fiber Tear | |
| 700/Vinyl Acetate Graft, 100/100 | Cationic | | | | | 1.0 | 70 | |
| | | | | | | 1.5 | 95 | |
| | | | | | 1.10 | 0.5 | 85 | 16.3 |
| | | | | | | 1.0 | 100 | |
| | | | | | | 1.5 | — | |
| E.T. Astro ® X-200/Vinyl Acetate Graft, 60/100 | 0.03 Cationic | — | — | — | 2.34 | 0.5 | — | 22.6 |
| | | | | | | 1.0 | — | |
| | | | | | | 1.5 | 50 | |
| | | | | | 1.86 | 0.5 | — | 21.9 |
| | | | | | | 1.0 | 20 | |
| | | | | | | 1.5 | 90 | |
| | | | | | 1.22 | 0.5 | — | 23.9 |
| | | | | | | 1.0 | 0 | |
| | | | | | | 1.5 | — | |
| E.T. Astro ® X-200/Vinyl Acetate Graft 100/100 | 0.03 Cationic | — | — | — | 2.46 | 0.5 | — | 22.7 |
| | | | | | | 1.0 | 0 | |
| | | | | | | 1.5 | 80 | |
| | | | | | 1.91 | 0.5 | — | 22.2 |
| | | | | | | 1.0 | 40 | |
| | | | | | | 1.5 | 95 | |
| | | | | | 1.34 | 0.5 | — | 20.8 |
| | | | | | | 1.0 | 87 | |
| | | | | | | 1.5 | — | |
| E.T. Astro ® X-50/Vinyl Acetate Graft 60/100 | 0.05 Cationic | — | — | — | 2.52 | 0.5 | — | 18.8 |
| | | | | | | 1.0 | — | |
| | | | | | | 1.5 | 50 | |
| | | | | | 1.84 | 0.5 | — | 18.6 |
| | | | | | | 1.0 | 15 | |
| | | | | | | 1.5 | 70 | |
| | | | | | 1.32 | 0.5 | — | 18.9 |
| | | | | | | 1.0 | 70 | |
| | | | | | | 1.5 | — | |
| E.T. Astro ®X-Vinyl Acetate Graft 100/100 | 0.05 Cationic | — | — | — | 2.42 | 0.5 | — | |
| | | | | | | 1.0 | 0 | |
| | | | | | | 1.5 | 0 | |
| | | | | | 1.89 | 0.5 | — | 17.1 |
| | | | | | | 1.0 | 40 | |
| | | | | | | 1.5 | — | |
| | | | | | 1.22 | 0.5 | 0 | 17.5 |
| | | | | | | 1.0 | 50 | |
| | | | | | | 1.5 | — | |
| E.T. Astro ® 21/Vinyl Acetate Graft, 60/100 | 0.03 anionic | 3 | 50 | 60 | 2.47 | 0.5 | — | 21.9 |
| | | | | | | 1.0 | 10 | |
| | | | | | | 1.5 | 85 | |
| | | | | | 1.82 | 0.5 | 15 | 20.0 |
| | | | | | | 1.0 | 60 | |
| | | | | | | 1.5 | — | |
| E.T. Astro ® 21/Vinyl Acetate Graft, 100/100 | 0.03 anionic | 3 | 100 | 50 | 2.46 | 0.5 | — | 23.5 |
| | | | | | | 1.0 | 25 | |
| | | | | | | 1.5 | 68 | |
| | | | | | 1.85 | 0.5 | 25 | 21.4 |
| | | | | | | 1.0 | 65 | |
| | | | | | | 1.5 | 80 | |

Example 4

In this example, nonionic starches including lightly thinned, lightly oxidized hydroxyethylated corn starch (Pencote®, Penford Products Co., Cedar Rapids, Iowa), underivatized corn starch (Thin Boil XR, Penford Products Co.), underivatized potato starch (Danish Potato, KMC brand, Kartoffelmelcentralen, Denmark) and underivatized waxy starch (Amioca, American Maize-Products Co.) were grafted with vinyl acetate following the procedure described in Example 1. The Pencote® and Thin Boil XR starches were used as received without enzyme thinning, while the potato and waxy starches were enzyme thinned according to Example 1 before being subjected to the grafting.

The grafted starch dispersions were analyzed for grafting efficiency according to the procedure of Example 2 with the results shown Table 4-A. Basecoated paperboards were also coated with these dispersions according to the coating procedure of Example 3, in which protein was replaced with these vinyl acetate grafted nonionic starch dispersions. Table 4-B shows the properties of the coated boards.

TABLE 4-A

Grafting Results of Vinyl Acetate Grafted Nonionic Starches

| Sample | Monomer/ Starch Ratio | Solids (%) | Brookfield Viscosity | | | Particle Size (nm) | Grafting Eff. (%) |
|---|---|---|---|---|---|---|---|
| | | | Spindle No. | RPM | Viscosity (cps) | | |
| Pencote ®/ | 20/100 | 38.9 | 2 | 20 | 7600 | 196 | 98.8 |
| Vinyl | 40/100 | 38.1 | 2 | 20 | 1800 | 258 | 78.7 |
| Acetate | 60/100 | 39.3 | 2 | 20 | 800 | 320 | 23.5 |
| Graft | 80/100 | 37.9 | 2 | 20 | 320 | 288 | 28.8 |
| | 100/100 | 39.3 | 2 | 20 | 320 | 309 | 12.0 |
| Thin Boil | 60/100 | 37.5 | 2 | 20 | 1530 | 409 | 39.1 |
| XR/Vinyl | 80/100 | 39.3 | 2 | 10 | 2980 | 611 | 32.8 |
| Acetate Graft | 100/100 | 38.3 | 3 | 20 | 2100 | 407 | 38.3 |
| E.T. Danish | 60/100 | 39.8 | 3 | 20 | 3050 | 711 | 29.8 |
| Potato/ | 80/100 | 39.6 | — | — | — | 700 | 21.8 |
| Vinyl Acetate Graft | 100/100 | 39.2 | 1 | 50 | 116 | 543 | 22.7 |
| E.T. Amioca/ | 60/100 | 38.6 | 1 | 50 | 164 | 364 | 29.0 |
| Vinyl | 80/100 | 38.9 | 2 | 50 | 144 | 561 | 20.8 |
| Acetate Graft | 100/100 | 37.2 | 1 | 50 | 114 | 502 | 25.2 |

E.T. = enzyme thinned.

TABLE 4-B

Coating Results of Nonionic Starches

| Sample | Brookfield Viscosity at 48% Solids | | | Coat Wt. (lbs/ 1000 ft$^2$) | Glueability | | Uncalendered Gloss (%) |
|---|---|---|---|---|---|---|---|
| | Spindle No. | RPM | Viscosity (cps) | | Glue Time (min.) | % Fiber Tear | |
| Pencote ®/ Vinyl Acetate Graft, 60/100 | — | — | — | 2.89 | 0.5<br>1.0<br>1.5 | —<br>—<br>75 | 20.5 |
| | | | | 2.10 | 0.5<br>1.0<br>1.5 | —<br>0<br>45 | 14.9 |
| | | | | 0.96 | 0.5<br>1.0<br>1.5 | 100<br>100<br>— | 10.0 |
| Pencote ®/ Vinyl Acetate Graft, 100/100 | — | — | — | 1.52 | 0.5<br>1.0<br>1.5 | —<br>0<br>87 | 14.4 |
| | | | | 0.97 | 0.5<br>1.0<br>1.5 | 80<br>100<br>— | 10.9 |
| Thin Boil XR/Vinyl Acetate Graft, 60/100 | 2 | 100 | 56 | 2.01 | 0.5<br>1.0<br>1.5 | —<br>60<br>80 | 26.3 |
| | | | | 1.18 | 0.5<br>1.0<br>1.5 | 75<br>75<br>— | 12.7 |
| Thin Boil XR/Vinyl Acetate Graft, 100/100 | 2 | 100 | 56 | 1.80 | 0.5<br>1.0<br>1.5 | —<br>40<br>80 | 24.6 |
| | | | | 1.01 | 0.5<br>1.0<br>1.5 | 90<br>100<br>— | 13.4 |
| E.T. Danish Potato/ Vinyl Acetate Graft, 60/100 | 3 | 100 | 170 | 1.68 | 0.5<br>1.0<br>1.5 | —<br>15<br>80 | 21.2 |
| | | | | 0.98 | 0.5<br>1.0<br>1.5 | 95<br>100<br>— | 9.4 |
| E.T. Danish Potato/ Vinyl Acetate Graft, 100/100 | 2 | 100 | 48 | 1.76 | 0.5<br>1.0<br>1.5 | —<br>35<br>60 | 28.4 |
| | | | | 1.14 | 0.5<br>1.0<br>1.5 | 95<br>100<br>— | 10.8 |
| E.T. Amioca/ Vinyl Acetate Graft, 60/100 | 2 | 100 | 52 | 1.96 | 0.5<br>1.0<br>1.5 | —<br>15<br>10 | 30.7 |
| | | | | 1.24 | 0.5<br>1.0<br>1.5 | 60<br>98<br>— | 16.3 |
| E.T. Amioca/ Vinyl Acetate Graft, 100/100 | 2 | 100 | 60 | 1.81 | 0.5<br>1.0<br>1.5 | —<br>70<br>70 | 28.3 |
| | | | | 1.11 | 0.5<br>1.0<br>1.5 | 90<br>100<br>— | 15.1 |

Example 5

According to this example, vinyl acetate was grafted to dual cationic starch derivatives including starches containing both anionic and cationic charged substituents (amphoteric starches). The amphoteric starches with different anionic/cationic (A/C) molar ratios were produced from corn starch as well as from potato starch. Specifically, these amphoteric starches were prepared by introducing the anionic charged substituent to the commercially available cationic starches such as Apollo® 500 (with cationic DS=0.03); and Apollo® 700 (with cationic DS=0.05) and Astro® X-200 (with cationic DS=0.03).

Amphoteric starches used in this example were produced in an alcohol/water medium. Although some starches with a lower degree of substitution could be prepared in an aqueous medium to be consistent, all amphoteric starches were prepared in the alcohol/water mixture. Table 5-A shows the chemical compositions used in the reactions of an anionic reagent (3-chloro-2-hydroxy-1-propane sulfonic acid sodium salt) with commercially available cationic starches.

A typical procedure to make an amphoteric starch from cationic starch, i.e., Apollo® 500 is described as follows: In a reaction vessel, 1296 g dry of Apollo® 500 starch (8 moles) was slurried in a mixture of 605 g of isopropanol and 1947 g of water with mechanical stirring. An amount of 264 g of 5% aqueous NaOH solution (0.33 mole) was slowly added to the starch slurry at room temperature with vigorous agitation, then 100 g of 30% aqueous solution of 3-chloro-2-hydroxy-1-propane sulfonic acid sodium salt (0.15 mole) (Aldrich Chemical Co., Milwaukee, Wis.) was slowly added. The reaction vessel was closed and the temperature was raised to 50° C. which was maintained with constant stirring for 24 hours. The reactor contents were then cooled to room temperature and neutralized to pH=7.0 with an $H_2SO_4$/ethanol mixture (50/100 by volume). The amphoteric starch product was dewatered on a suction filter. The starch filter cake was then reslurried in 3 liters of a 20/80 by volume ethanol/water mixture and filtered (when higher substituted starches were synthesized, they were reslurried in an ethanol/water mixture with a higher amount of alcohol to prevent the gelation which could stop the filtration). This process was repeated until all of the unreacted monomer and salt byproducts were removed. The starch filter cake was crumbled and dried at room temperature to a moisture of 9 to 12%. The dried amphoteric starch was then ground in Raymond mill and stored in a plastic bag.

The amphoteric starches were first enzyme thinned and then grafted with vinyl acetate at a monomer/starch ratio of 60/100 according to the grafting procedure in Example 1 using 2% potassium persulfate initiator and 1% buffer based on monomer weight. Table 5-B shows the properties of the vinyl acetate grafted amphoteric starch dispersions. Coating compositions were then prepared and applied to base coated paperboards according to the procedures of Example 3. The gloss and stability results of the coated boards are shown in Table 5-C.

TABLE 5-A

Chemical Compositions Used to Produce Amphoteric Starches

| Starting Starches (dry weight) | Code for Ampho. Starch | Amphoteric Substitutions | | | Reagents Used | | | |
|---|---|---|---|---|---|---|---|---|
| | | Cat. DS | Target An. DS | Target An/Cat Molar Ratio | Isop. (g) | Water (g) | 5% Aq NaOH Soln. (g) | 30% An. Reagent (g) |
| Apollo ® 500, 1296 g | I | 0.03 | 0.015 | 0.5 | 605 | 1947 | 264 | 100 |
| Apollo ® 500, 1296 g | II | 0.03 | 0.03 | 1.0 | 1102 | 891 | 488 | 190 |
| Apollo ® 500, 1296 g | III | 0.03 | 0.045 | 1.5 | 1814 | 185 | 704 | 275 |
| Apollo ® 700, 810 g | IV | 0.05 | 0.02 | 0.4 | 1089 | 467 | 220 | 83 |
| Apollo ® 700, 1296 g | V | 0.05 | 0.05 | 1.0 | 1971 | 148 | 800 | 315 |
| Apollo ® 700, 1134 g | VI | 0.05 | 0.075 | 1.5 | 1958 | 0 | 1072 | 440 |
| Astro ® X-200, 1296 g | VII | 0.03 | 0.015 | 0.5 | 605 | 1904 | 264 | 100 |
| Astro ® X-200, 1296 g | VIII | 0.03 | 0.03 | 1.0 | 1102 | 862 | 488 | 190 |
| Astro ® X-200, 1296 g | IX | 0.03 | 0.045 | 1.5 | 1814 | 189 | 704 | 275 |

TABLE 5-B

Properties of Amphoteric Starches Grafted With Vinyl Acetate

| Sample | A/C Ratio | Solids (%) | Spindle No. | RPM | Visc. (cps) | Particle Size (nm) |
|---|---|---|---|---|---|---|
| Amphoteric I | 0.5 | 38.4 | 3 | 10 | 7100 | 427 |
| Amphoteric II | 1.0 | 38.9 | 3 | 10 | 5300 | 481 |
| Amphoteric III | 1.5 | 35.3 | 3 | 20 | 1050 | 517 |
| Amphoteric IV | 0.4 | 38.8 | 3 | 10 | 6600 | 462 |

TABLE 5-B-continued
Properties of Amphoteric Starches Grafted With Vinyl Acetate

| Sample | A/C Ratio | Solids (%) | Spindle No. | RPM | Visc. (cps) | Particle Size (nm) |
|---|---|---|---|---|---|---|
| Amphoteric V | 1.0 | 42.8 | 3 | 20 | 500 | 432 |
| Amphoteric VI | 1.5 | 36.5 | 3 | 20 | 600 | 541 |
| Amphoteric VII | 0.5 | 23.8 | 1 | 10 | 880 | 961 |
| Amphoteric VIII | 1.0 | 27.7 | 1 | 10 | 280 | 603 |
| Amphoteric IX | 1.5 | 28.1 | 1 | 10 | 210 | 599 |

TABLE 5-C
Coating Results of Vinyl Acetate Grafted Amphoteric Starch Dispersions

| Sample | Brookfield Viscosity at 48% Solids | | | Coat Wt. (lbs/1000 ft$^2$) | Glueability | | Uncalendared Gloss (%) |
|---|---|---|---|---|---|---|---|
| | Spindle No. | RPM | Visc. (cps) | | Glue Time (min.) | % Fiber Tear | |
| Amphoteric I/Vinyl Acetate Graft | 3 | 50 | 380 | 2.43 | 0.5 | 90 | 16.8 |
| | | | | | 1.0 | 97 | |
| | | | | | 1.5 | — | |
| | | | | 1.82 | 0.5 | 95 | 16.6 |
| | | | | | 1.0 | 97 | |
| | | | | | 1.5 | — | |
| Amphoteric II/Vinyl Acetate Graft | 3 | 50 | 160 | 2.55 | 0.5 | 15 | 19.3 |
| | | | | | 1.0 | 45 | |
| | | | | | 1.5 | — | |
| | | | | 1.82 | 0.5 | 88 | 17.4 |
| | | | | | 1.0 | 97 | |
| | | | | | 1.5 | — | |
| Amphoteric III/Vinyl Acetate Graft | 3 | 50 | 100 | 2.52 | 0.5 | 68 | 20.2 |
| | | | | | 1.0 | 85 | |
| | | | | | 1.5 | — | |
| | | | | 1.84 | 0.5 | 83 | 18.1 |
| | | | | | 1.0 | 95 | |
| | | | | | 1.5 | — | |
| Amphoteric IV/Vinyl Acetate Graft | 3 | 50 | 200 | 2.42 | 0.5 | 60 | 19.5 |
| | | | | | 1.0 | 85 | |
| | | | | | 1.5 | — | |
| | | | | 1.83 | 0.5 | 60 | 17.8 |
| | | | | | 1.0 | 98 | |
| | | | | | 1.5 | — | |
| Amphoteric V/Vinyl Acetate Graft | 3 | 100 | 80 | 2.42 | 0.5 | 70 | 19.5 |
| | | | | | 1.0 | 88 | |
| | | | | | 1.5 | — | |
| | | | | 1.82 | 0.5 | 70 | 18.5 |
| | | | | | 1.0 | 88 | |
| | | | | | 1.5 | — | |
| Amphoteric VI/Vinyl Acetate Graft | 3 | 50 | 160 | 2.54 | 0.5 | 73 | 19.5 |
| | | | | | 1.0 | 95 | |
| | | | | | 1.5 | — | |
| | | | | 1.87 | 0.5 | 73 | 18.3 |
| | | | | | 1.0 | 97 | |
| | | | | | 1.5 | — | |
| Amphoteric VII/Vinyl Acetate Graft | 3 | 50 | 520 | 2.62 | 0.5 | — | 17.7 |
| | | | | | 1.0 | 30 | |
| | | | | | 1.5 | 50 | |
| | | | | 1.91 | 0.5 | 20 | 17.1 |
| | | | | | 1.0 | 55 | |
| | | | | | 1.5 | 70 | |
| Amphoteric VIII/Vinyl Acetate Graft | 3 | 50 | 180 | 2.39 | 0.5 | 78 | 19.3 |
| | | | | | 1.0 | 90 | |
| | | | | | 1.5 | — | |
| | | | | 1.91 | 0.5 | 90 | 18.4 |
| | | | | | 1.0 | 98 | |
| | | | | | 1.5 | — | |
| Amphoteric IX/Vinyl Acetate Graft | 3 | 50 | 120 | 2.46 | 0.5 | 80 | 19.7 |
| | | | | | 1.0 | 80 | |

TABLE 5-C-continued

Coating Results of Vinyl Acetate Grafted Amphoteric Starch Dispersions

| Sample | Brookfield Viscosity at 48% Solids | | | Coat Wt. (lbs/ 1000 ft²) | Glueability | | Un-calendared Gloss (%) |
|---|---|---|---|---|---|---|---|
| | Spindle No. | RPM | Visc. (cps) | | Glue Time (min.) | % Fiber Tear | |
| | | | | 1.92 | 1.5 | — | 18.6 |
| | | | | | 0.5 | 75 | |
| | | | | | 1.0 | 95 | |
| | | | | | 1.5 | — | |

Example 6

This example illustrates the effect of surfactants used in the vinyl acetate grafting reaction on the coating properties of coated paperboards.

Different types of surfactants were employed which included nonionic surfactant (Triton® X-100 from Rohm and Hass Co.), anionic surfactant (Dodecylbenzenesulfonic acid, sodium salt (DBSA), from Aldrich Chemical Co.), cationic surfactant (Cetyltrimethylammonium chloride (CTAC), from Aldrich Chemical Co.) and a combination of both mentioned anionic and cationic surfactants at 50/50 by weight. the amount of surfactant used varied from 1 to 5% based on the monomer weight. The enzyme thinned cationic starch (E. T. Appollo® 700) was used in the grafting with vinyl acetate at a monomer/starch ratio of 60/100 following the procedure in Example 1, with 2% potassium persulfate initiator and 1% buffer based on monomer weight being used. The properties of the grafted starch dispersions are shown in Table 6-A.

Coating compositions comprising these dispersions were also prepared and coated on the paperboards according to the methods of Example 3. The properties of the coated paperboards such as glueability and gloss were evaluated and compared to the coating containing protein as the control. Table 6-B shows the effect of surfactants on the glueability and gloss of paperboards coated with vinyl acetate grafted Apollo® 700 starches. All of surfactants used significantly improved the glueability as well as the gloss of the coated boards with some of the products outperforming the protein control.

TABLE 6-A

Use of Surfactants in Grafting Vinyl Acetate to Cationic Starch (Apollo ® 700)

| Surfactant | Amount Used (%) | Solids (%) | Spindle No. | RPM | Viscosity (cps) | Particle Size (nm) |
|---|---|---|---|---|---|---|
| Nonionic (Triton ® X-100) | 3 | 38.9 | 2 | 20 | 720 | 351 |
| | 5 | 39.8 | 2 | 20 | 880 | 360 |
| Anionic (DBSA) | 1 | 42.3 | 2 | 20 | 1060 | 288 |
| | 3 | 38.4 | 2 | 20 | 1560 | 264 |
| | 5 | 38.5 | 2 | 20 | 1200 | 309 |
| Cationic (CTAC) | 3 | 40.6 | 2 | 20 | 1140 | 383 |
| | 5 | 38.3 | 2 | 20 | 1100 | 365 |
| Anionic/ Cationic Blend at 50/50 | 3 | 38.7 | 2 | 20 | 740 | 323 |
| | 5 | 37.6 | 2 | 20 | 760 | 306 |

TABLE 6-B

Effect of Surfactants on the Coating Properties of Vinyl Acetate Grafted Apollo ® 700 Starch

| Grafted Samples | Brookfield Viscosity at 48% Solids | | | Coat Wt. (lbs/ 1000 ft²) | Glueability | | Un-calendared Gloss (%) |
|---|---|---|---|---|---|---|---|
| | Spindle No. | RPM | Viscosity (cps) | | Glue Time (min.) | % Fiber Tear | |
| Protein (Control) | 3 | 20 | 400 | 2.60 | 0.5 | — | 23.6 |
| | | 50 | 260 | | 1.0 | 50 | |
| | | 100 | 180 | | 1.5 | 100 | |
| | | | | 1.91 | 0.5 | — | 22.6 |
| | | | | | 1.0 | 85 | |
| | | | | | 1.5 | 97 | |
| | | | | 1.40 | 0.5 | 0 | 22.5 |
| | | | | | 1.0 | 90 | |
| Nonionic (Triton ® X-100) at 3% | 3 | 50 | 160 | 2.46 | 0.5 | 78 | 26.3 |
| | | | | | 1.0 | 93 | |
| | | | | 1.82 | 0.5 | 88 | 24.6 |

TABLE 6-B-continued

Effect of Surfactants on the Coating Properties of
Vinyl Acetate Grafted Apollo ® 700 Starch

| Grafted Samples | Brookfield Viscosity at 48% Solids | | Coat Wt. (lbs/ 1000 ft²) | Glueability | | Un- calendered Gloss (%) |
|---|---|---|---|---|---|---|
| | Spindle No. | RPM / Viscosity (cps) | | Glue Time (min.) | % Fiber Tear | |
| at 5% | 3 | 50 / 140 | 2.48 | 1.0 | 95 | |
| | | | | 0.5 | 80 | 26.8 |
| | | | | 1.0 | 93 | |
| | | | 1.83 | 0.5 | 85 | 24.6 |
| | | | | 1.0 | 93 | |
| Anionic (DBSA) at 1% | 3 | 100 / 160 | 2.60 | 1.0 | 60 | 20.0 |
| | | | | 1.5 | 78 | |
| | | | 1.93 | 0.5 | 60 | 18.0 |
| | | | | 1.0 | 80 | |
| at 3% | 3 | 50 / 260 | 2.52 | 0.5 | 95 | 23.5 |
| | | | | 1.0 | 100 | |
| | | | 1.85 | 0.5 | 95 | 23.7 |
| | | | | 1.0 | 100 | |
| at 5% | 3 | 50 / 220 | 2.61 | 0.5 | 85 | 25.4 |
| | | | | 1.0 | 95 | |
| | | | 1.84 | 0.5 | 85 | 23.6 |
| | | | | 1.0 | 100 | |
| Cationic (CTAC) at 3% | 3 | 50 / 260 | 2.42 | 0.5 | 90 | 25.6 |
| | | | | 1.0 | 95 | |
| | | | 1.88 | 0.5 | 95 | 24.6 |
| | | | | 1.0 | 100 | |
| at 5% | 3 | 50 / 260 | 2.42 | 0.5 | 70 | 25.7 |
| | | | | 1.0 | 95 | |
| | | | 1.97 | 0.5 | 85 | 24.7 |
| | | | | 1.0 | 98 | |
| Anionic/Cationic Blend at 3% | 3 | 50 / 160 | 2.55 | 0.5 | — | 25.7 |
| | | | | 1.0 | 35 | |
| | | | 1.95 | 0.5 | 90 | 25.1 |
| | | | | 1.0 | 95 | |
| at 5% | 3 | 50 / 200 | 2.46 | 1.0 | 32 | 25.1 |
| | | | | 1.5 | 95 | |
| | | | 1.82 | 0.5 | 0 | 24.2 |
| | | | | 1.0 | 57 | |

Example 7

This example shows the effect of varying monomer/starch ratios on the coating properties of paperboards coated with coating colors comprising vinyl acetate cationic starch grafts as binders.

According to this example,, the grafting of vinyl acetate to enzyme thinned Apollo®700 described in Example 1 was reproduced at various monomer/starch (M/S) ratios ranging from 20/100 to 200/100. The grafting reaction was carried out utilizing 2% by weight potassium persulfate initiator and 1% by weight sodium bicarbonate buffer based on monomer. The results of grafting and the properties of the dispersions are shown in Table 7-A. The grafted dispersions were used to produce paperboard coatings according to the methods of Example 3. The gloss and glueability properties of the coated boards are illustrated in Table 7-B.

TABLE 7-A

Effect of Monomer/Starch Ratios on Properties of Cationic Starch Graft

| Monomer/ Starch Ratio | Solids (%) | Brookfield Viscosity | | | Particle Size (nm) | Grafting Eff. (%) |
|---|---|---|---|---|---|---|
| | | Spindle No. | RPM | Viscosity (cps) | | |
| 20/100 | 30.9 | 2 | 20 | 420 | 180 | — |
| 40/100 | 33.6 | 2 | 20 | 360 | 229 | — |
| 60/100 | 38.4 | 1 | 10 | 700 | 288 | 63.4 |
| 80/100 | 39.0 | 3 | 50 | 540 | 369 | — |
| 100/100 | 38.3 | 1 | 10 | 270 | 387 | 32.9 |
| 140/100 | 38.9 | 2 | 20 | 780 | 622 | — |
| 200/100 | 39.7 | 2 | 20 | 200 | 542 | — |

TABLE 7-B

| | | Brookfield Viscosity at 48% Solids | | | Glueability | | |
|---|---|---|---|---|---|---|---|
| Monomer/ Starch Ratio | Spindle No. | RPM | Viscosity (cps) | Coat Wt. (lbs/ 1000 ft²) | Glue Time (min.) | % Fiber Tear | Uncalendered Gloss (%) |
| 60/100 | 2 | 50 | 220 | 1.99 | 1.0 | 60 | 25.2 |
| | | | | | 1.5 | 90 | |
| | | | | 0.99 | 0.5 | 60 | 15.0 |
| | | | | | 1.0 | 100 | |
| 100/100 | 2 | 20 | 120 | 1.91 | 1.0 | 70 | 24.7 |
| | | | | | 1.5 | 95 | |
| | | | | 1.10 | 0.5 | 85 | 16.3 |
| | | | | | 1.0 | 100 | |
| 140/100 | 3 | 50 | 160 | 2.42 | 0.5 | 50 | 28.9 |
| | | | | | 1.0 | 75 | |
| | | | | 1.82 | 0.5 | 10 | 28.7 |
| | | | | | 1.0 | 100 | |
| 200/100 | 3 | 100 | 120 | 2.48 | 1.0 | 0 | 31.1 |
| | | | | | 1.5 | 40 | |
| | | | | 1.85 | 0.5 | 0 | 30.4 |
| | | | | | 1.0 | 55 | |

Example 8

In this example, the effect of the degree of enzyme thinning of the starch on the grafting as well as on the properties of the coated paperboards was examined.

A cationic corn starch with a degree of substitution of 0.05 (Apollo® 700) was used in this example. The starch was first enzyme thinned with 25, 75, 175 and 250 microliters of alph-amylase per 500 grams of dry starch by following the enzyme thinning procedure in Example 1. After enzyme thinning, the starch was subjected to grafting with vinyl acetate at a monomer/starch ratio of 60/100 according to the grafting procedure described in Example 1 with the results shown in Table 8-A below. The grafted dispersions were used to top coat paperboard according to the methods of Example 3 with the gloss and glueability properties of the coated boards shown in Table 8-B below.

TABLE 8-A

Effect of Degree of Enzyme Thinning of Apollo ® 700 in Grafting with Vinyl Acetate

| Amount of Amylase (microliters/500 g dry starch) | Solids (%) | Brookfield Viscosity | | | Particle Size (nm) |
|---|---|---|---|---|---|
| | | Spindle No. | RPM | Viscosity (cps) | |
| 25 | 39.4 | 4 | 20 | 3100 | 379 |
| 75 | 39.2 | 4 | 20 | 1300 | 328 |
| 175 | 39.3 | 2 | 20 | 276 | 328 |
| 250 | 42.0 | 2 | 20 | 290 | 349 |

TABLE 8-B

Effect of Degree of Enzyme Thinning of Apollo ® 700 on Paperboard Coating Properties

| Amount of Amylase (microliters/ 500 g dry starch) | Brookfield Viscosity at 48% Solids | | | Coat Wt. (lbs/ 1000 ft²) | Glueability | | Un- calendered Gloss (%) |
|---|---|---|---|---|---|---|---|
| | Spindle No. | RPM | Viscosity (cps) | | Glue Time (min.) | % Fiber Tear | |
| 25 | 3 | 20 | 1300 | 2.50 | 1.0 | 65 | 27.7 |
| | | | | 1.99 | 0.5 | 10 | 26.5 |
| | | | | | 1.0 | 60 | |
| 75 | 3 | 20 | 500 | 2.42 | 1.0 | 50 | 28.3 |
| | | | | 1.97 | 0.5 | 20 | 27.8 |
| | | | | | 1.0 | 80 | |
| 175 | 3 | 50 | 160 | 2.61 | 1.5 | 15 | 30.1 |
| | | | | 1.95 | 0.5 | 0 | 29.3 |
| | | | | | 1.0 | 85 | |
| 250 | 3 | 50 | 100 | 2.55 | 1.0 | 0 | 31.1 |
| | | | | | 1.5 | 0 | |
| | | | | 1.97 | 1.0 | 40 | 30.1 |

Example 9

According to this example, various comonomers were used in the process of grafting vinyl acetate onto starch. The effect of the comonomers on grafting and on the properties of coated paperboards was then examined. The comonomers used in the present invention were classified into four groups including crosslinkers, nonionic monomers, anionic charged monomers and cationic charged monomers as described below. Suitable crosslinkers include all those capable of reacting with vinyl acetate with N-methylol acrylamide and divinyl benzene being particularly preferred. A wide variety of nonionic monomers can be used as comonomers with vinyl acetate. Suitable nonionic monomers include those which are known as plasticizers for polyvinyl acetate with butyl acrylate being particularly preferred. Anionic charged monomers may also be used according to the present invention and can be reacted with the vinyl acetate and/or the starch in the graftings with preferred anionic monomers including acrylic acid and maleic anhydride. Cationic charged monomers including those containing a nitrogen atom which are capable of reaction either with the vinyl acetate and/or starch also can be used in the graftings of the invention with 4-vinyl pyridine being particularly preferred.

According to this example, Apollo® 700 starch with a cationic degree of substitution of 0.05 was enzyme thinned and then grafted with a mixture of vinyl acetate and comonomer, at a total monomers/starch ratio of 60/100, according to the procedure of Example 1. In the monomer portion, an amount of 1, 3 and 5% of vinyl acetate was replaced with the comonomer. The resulting dispersions were then coated onto base coated paperboards according to the procedure of Example 3. The results of the graftings and paperboard coatings are shown in Tables 9-A and 9-B, respectively.

TABLE 9-A

Use of Comonomers in Grafting With Vinyl Acetate to Apollo® 700 Starch

| Co-monomer | Amount used, % | Solids (%) | Brookfield Viscosity Spindle No. | RPM | Viscosity (cps) | Particle Size (nm) |
|---|---|---|---|---|---|---|
| N-Methylol acrylamide | 3 | 38.7 | 3 | 20 | 1950 | 236 |
| | 5 | 37.2 | 3 | 20 | 4500 | 315 |
| Divinyl benzene | 3 | 38.7 | 4 | 20 | 6800 | 296 |
| | 5 | 39.5 | 4 | 20 | 7800 | 337 |
| Butyl acrylate | 3 | 40.6 | 2 | 20 | 1000 | 348 |
| | 5 | 41.3 | 2 | 20 | 900 | 368 |
| Acrylic acid | 3 | 39.9 | 3 | 10 | 8200 | 680 |
| | 5 | 39.2 | 4 | 10 | 19600 | 1689 |
| 4-Vinyl pyridine | 1 | 39.0 | 3 | 50 | 1360 | — |
| | 3 | 37.8 | 3 | 50 | 1560 | — |

TABLE 9-B

Effect of Comonomers on Coating Properties

| Sample | Brookfield Viscosity at 48% Solids Spindle No. | RPM | Viscosity (cps) | Coat Wt. (lbs/1000 ft$^2$) | Glueability Glue Time (min.) | % Fiber Tear | Un-calendered Gloss (%) |
|---|---|---|---|---|---|---|---|
| Protein (Control) | 3 | 20 | 400 | 2.60 | 0.5 | — | 23.6 |
| | | 50 | 260 | | 1.0 | 50 | |
| | | 100 | 180 | | 1.5 | 100 | |
| | | | | 1.91 | 0.5 | — | 22.6 |
| | | | | | 1.0 | 85 | |
| | | | | | 1.5 | 97 | |
| | | | | 1.40 | 0.5 | 0 | 22.5 |
| | | | | | 1.0 | 90 | |
| N-Methylol acrylamide at 3% | 3 | 20 | 1450 | 2.82 | 0.5 | — | 27.9 |
| | | | | | 1.0 | — | |
| | | | | | 1.5 | 0 | |
| | | | | | 2.0 | 50 | |
| | | | | 1.85 | 0.5 | — | 27.0 |
| | | | | | 1.0 | 0 | |
| | | | | | 1.5 | 65 | |
| at 5% | 3 | 20 | 2900 | 2.45 | 0.5 | — | 24.7 |
| | | | | | 1.0 | — | |
| | | | | | 1.5 | 23 | |
| | | | | | 2.0 | 85 | |
| | | | | 1.97 | 0.5 | — | 23.9 |
| | | | | | 1.0 | 10 | |
| | | | | | 1.5 | 75 | |
| Divinyl benzene at 3% | 3 | 20 | 3500 | 2.67 | 1.5 | 40 | 22.6 |
| | | | | | 2.0 | 80 | |
| | | | | 1.90 | 1.0 | 20 | 22.4 |
| | | | | | 1.5 | 70 | |
| at 5% | 3 | 20 | 3550 | 2.59 | 1.0 | 0 | 23.0 |
| | | | | | 1.5 | 70 | |
| | | | | 1.89 | 0.5 | 0 | 22.0 |
| | | | | | 1.0 | 40 | |
| Butyl acrylate at 3% | 3 | 50 | 260 | 2.48 | 0.5 | 80 | 26 |
| | | | | | 1.0 | 95 | |
| | | | | 1.82 | 0.5 | 80 | 25.0 |
| | | | | | 1.0 | 97 | |
| at 5% | 3 | 50 | 180 | 2.48 | 0.5 | 50 | 25.9 |
| | | | | | 1.0 | 87 | |
| | | | | 1.91 | 0.5 | 50 | 24.2 |
| | | | | | 1.0 | 95 | |
| Acrylic acid | Too | | | | | | |

TABLE 9-B-continued

Effect of Comonomers on Coating Properties

| Sample | Brookfield Viscosity at 48% Solids | | | Coat Wt. (lbs/1000 ft$^2$) | Glueability | | Un-calendered Gloss (%) |
|---|---|---|---|---|---|---|---|
| | Spindle No. | RPM | Viscosity (cps) | | Glue Time (min.) | % Fiber Tear | |
| at 3% | Thick To Coat | | | | | | |
| at 5% | Too Thick To Coat | | | | | | |
| 4-Vinyl pyridine at 1% | 3 | 50 | 480 | 2.42 | 0.5 | 55 | 22.2 |
| | | | | | 1.0 | 80 | |
| | | | | | 1.5 | 80 | |
| | | | | 1.79 | 0.5 | 68 | 20.3 |
| | | | | | 1.0 | 80 | |
| at 3% | 3 | 50 | 640 | 2.68 | 1.0 | 60 | 21.9 |
| | | | | | 1.5 | 85 | |
| | | | | 1.83 | 0.5 | 65 | 20.0 |
| | | | | | 1.0 | 80 | |

Example 10

In this example, a comparison of glueability and gloss properties of base coated paperboards top coated with protein as a control, with those of a preferred vinyl acetate containing product of the invention, was conducted at higher coat weights. The vinyl acetate product is an enzyme thinned (E.T.) Apollo®700 starch grafted with vinyl acetate at monomer/starch ratio of 60/100 in the presence of 3% DBSA surfactant.

Coating colors were prepared and paperboard coated according to the method of Example 3. Coating compositions comprising protein as the control and the vinyl acetate cationic starch product were applied onto paperboards which has been precoated with 2.7 lbs/1000 ft$^2$. Top coat weights of 2,3 and 5 lbs/1000 ft$^2$ were targeted. Table 10 shows a comparison of the glueability and uncalendered gloss properties of board coated using a protein binder and with the vinyl acetate/cationic starch product. The results indicate that the vinyl acetate product provides glueability equal to or slightly better of the protein containing control. The product also provides a gloss superior to that of the protein control.

TABLE 10

A Comparison of Glueability and Gloss of Protein and Vinyl Acetate/Cationic Starch Product

| Nominal Coat Weight lbs/1000 ft$^2$ | Glue Time (min.) | Glueability (% fiber tear) | | Uncalendered Gloss, % | |
|---|---|---|---|---|---|
| | | Protein Control | Vinyl Acetate Cationic Starch | Protein Control | Vinyl Acetate Cationic Starch |
| 2 | 0.5 | 40 | 60 | 17.1 | 22.3 |
| | 1.0 | 90 | 93 | | |
| 3 | 0.5 | 30 | 65 | 18.3 | 24.0 |
| | 1.0 | 90 | 85 | | |
| 5 | 1.0 | 60 | 70 | 18.9 | 25.3 |
| | 1.5 | 78 | 80 | | |

Example 11

According to this example, blends of the cationic starch (Apollo® 700) with polyvinyl acetate latices at polyvinyl acetate/starch ratio of 60/100 parts were prepared. The coating compositions containing these blends were coated onto paperboards and the coating properties were compared with the cationic starch (Apollo® 700) grafted with vinyl acetate at the same monomer/starch ratio. The blends were prepared as below.

Apollo® 700 starch was first enzyme thinned according to the method of Example 1 before using in the blend with polyvinyl acetate latices. Two polyvinyl acetate latices were used, the first latex was a homopolymer of vinyl acetate (Vinac 881, Air Products and Chemicals, Inc., Allentown, Pa). The second polyvinyl acetate latex was prepared in the laboratory using a similar grafting procedure in Example 1 with the exception that polyvinyl alcohol (Airvol 523 from Air Products) was used as a protective colloid at 5% based on the monomer weight in replacing the starch.

The two latices were blended with the enzyme thinned Apollo® 700 starch paste at the same PVAc/starch ratio of 60/100 dry parts. The viscosities of these two blends are compared with the E.T. Apollo® 700 starch graft at the same monomer/starch ratio, and are shown in Table 11-A. The results indicate that the viscosities of the blends are extremely high, in fact, higher than the grafted starch. The blends also gelled up upon storage, while the grafted starch remained fluid. Due to the extremely high viscosity of the blends, these specific blend products would not be preferred for use in commercial applications.

Coating compositions comprising the blends and the starch graft were prepared and coated onto the precoated paperboards according to the coating procedure of Example 3. Table 11-B exhibits the viscosity, glueability and gloss of the coating compositions. Again, the results show that the viscosities of the coating compositions containing the polyvinyl acetate-starch blends were extremely high (almost flocking the clay) compared to the starch graft. The results also indicate that the glueability of the starch graft product is much better than that of the blends, and that the gloss is higher than that of the laboratory PVAc-Apollo® 700 starch blend, but lower than that of the Vinac-Apollo®700 starch blend. The high viscosity of the blends renders them nonpreferred for use in commercial coating applications. Nevertheless, the coatings are illustrative of the types of cationic starch/vinyl acetate binders provided by the invention and suggest the utility of lower viscosity blends.

TABLE 11-A

A Comparison of Viscosity of PVAc-Apollo ® 700 Starch Blends With Vinyl Acetate Apollo ® 700 Starch Graft

| Dispersion | Solids (%) | Brookfield Viscosity | | |
|---|---|---|---|---|
| | | Spindle No. | RPM | Viscosity (cps) |
| Apollo ® 700 starch graft | 38.4 | 1 | 10 | 700 |
| Vinac-Apollo ® 700 blend | 36.7 | 4 | 20 | 4600 |
| Lab PVAc-Apollo ® 700 blend | 39.3 | 4 | 50 | 5840 |

TABLE 11-B

A Comparison of Coating Compositions Comprising PVAc-Apollo ® 700 Starch Blends with Corresponding Graft

| Samples | Brookfield Viscosity at 48% Solids | | | Coat Wt. (lbs/1000 ft²) | Glueability | | Uncalendered Gloss (%) |
|---|---|---|---|---|---|---|---|
| | Spindle No. | RPM | Viscosity (cps) | | Glue Time (min.) | % Fiber Tear | |
| Apollo ® 700 starch graft | 2 | 50 | 220 | 1.99 | 1.0 | 60 | 25.2 |
| | | | | | 1.5 | 90 | |
| Vinac-Apollo ® 700 blend | 4 | 20 | 3800 | 2.05 | 1.0 | 0 | 28.3 |
| | | | | | 1.5 | 50 | |
| Lab PVAc-Apollo ® 700 blend | 4 | 20 | 5500 | 1.91 | 1.0 | 45 | 23.1 |
| | | | | | 1.5 | 63 | |

Example 12

This example illustrates a comparison of the coating properties of a cationic starch graft with nonionic and anionic starch grafts at a high coat weight. According to this example, the protein component of a board coating binder composition was replaced with various vinyl acetate grafted starch products which were derived from different starches including cationic corn starch (Apollo® 700); lightly thinned, lightly oxidized hydroxyethyl corn starch (Pencote®); lightly thinned, underivatized corn starch (Thin Boil XR); enzyme thinned, underivatized potato starch (Danish Potato Starch); enzyme thinned, underivatized waxy corn starch (Amioca); and enzyme thinned, anionic corn starch (Astro® 21).

The starches were grafted with vinyl acetate at a monomer/starch ratio of 60/100 according to the procedure of Example 1. The grafted starches were used to replace the protein in a board coating composition, and applied to base coated boards at a higher coat weight of 5 lbs/1000 ft² according to the procedure of Example 3. Table 12 shows the coating results of the grafted starch products. At a higher coat weight, cationic starch shows the best coating results for both glueability and gloss.

TABLE 12

Coating Results of Several Vinyl Acetate Grafted Starch Products at a High Coat Weight (5 lbs/1000 ft²)

| Grafted Starches | Glueability | | Uncalendered Gloss (%) |
|---|---|---|---|
| | Glue time (Min.) | Fiber Tear (%) | |
| Apollo ® 700 Starch (cationic) | 1.0 | 30 | 23.4 |
| | 1.5 | 80 | |
| Pencote ® Starch (nonionic) | 1.0 | 0 | 21.1 |
| | 1.5 | 5 | |
| Thin Boil XR Starch (nonionic) | 1.0 | 0 | 17.9 |
| | 1.5 | 6 | |
| Potato Starch (nonionic) | 1.0 | 0 | 21.3 |
| | 1.5 | 0 | |
| Amioca Starch (nonionic) | 1.0 | 0 | 21.0 |
| | 1.5 | 10 | |
| Astro ®21 Starch (anionic) | 1.0 | 0 | 22.0 |
| | 1.5 | 0 | |

Example 13

This example demonstrates compatibility and the use of vinyl acetate grafted cationic starch as a cobinder with other synthetic cobinder latices in the board coating compositions.

The coating compositions were prepared according to Example 3, in which the protein component of the binder was completely replaced with a vinyl acetate grafted cationic starch with a monomer/starch ratio of 60/100 and 3% DBSA according to Example 10. The synthetic cobinder portion of the binder in the formula of Example 3 (a carboxylated styrene/butadiene latex, Dow 6669, Dow Chemical Company) was completely replaced with the following latices. Vinac 881 (a vinyl acetate polymer latex from Air Products Company); Airflex 100HS (an ethylene/vinyl acetate copolymer latex from Air Products Company); Rhoplex P-554 (an acrylic polymer latex from Rohm and Haas Company); and Rhoplex P-310 (a vinyl acetate/acrylic copolymer latex from Rohm and Haas Company). The viscosities of the resulting coating compositions indicate that the vinyl acetate grafted starch is compatible with a variety of cobinders. The coating compositions, were applied onto precoated paperboards at a coat weight of 3.5 lbs/1000 ft² according to the method of Example 3. The gloss and glueability of the resulting boards are shown in Table 13 below.

TABLE 13

Coating Results of Different Latices as Cobinders With Vinyl Acetate Grafted Cationic Starch

| Grafted Starches | Glueability | | Uncalendered Gloss (%) |
|---|---|---|---|
| | Glue time (Min.) | Fiber Tear (%) | |
| Carboxylated SBR | 0.5 | 50 | 21.2 |
| (Dow 6669) | 1.0 | 70 | |
| Vinyl Acetate | 0.5 | 40 | 21.2 |
| (Vinac 881) | 1.0 | 70 | |
| Ethylene/Vinyl Acetate | 0.5 | 70 | 21.0 |
| (Airflex 100 HS) | 1.0 | 75 | |
| Acrylic Polymer | 0.5 | 60 | 21.6 |
| (Rhoplex P-554) | 1.0 | 70 | |
| Vinyl Acetate/Acrylic | 0.5 | 40 | 20.6 |
| (Rhoplex P-310) | 1.0 | 60 | |

Example 14

According to this example, acid thinned cationic starch was compared with enzyme thinned cationic starch in preparing the board coating binders of the invention. Specifically, a cationic corn starch (Apollo® 700) was first acid thinned to an alkaline fluidity of about 35 ml for 18 g dry starch in 52 g water. The acid thinned starch was then cooked at 30% solids and grafted with vinyl acetate at a monomer/starch ratio of 60/100 according to the procedure in Example 1. The grafted product was coated at a coat weight of 3.5 lbs/1000 ft² onto precoated paperboards according to the method of Example 3. The gloss and glueability of the coated boards were determined and are compared with those from a corresponding enzyme thinned cationic starch.

TABLE 14

Coating Results of Enzyme and Acid Thinned Grafted Cationic Starches

| Grafted Cationic Starches | Glueability | | Uncalendered Gloss (%) |
|---|---|---|---|
| | Glue Time (Min.) | Fiber Tear (%) | |
| Enzyme Thinned Starch | 0.5 | 50 | 21.2 |
| | 1.0 | 70 | |
| Acid Thinned Starch | 0.5 | 60 | 18.7 |
| | 1.0 | 85 | |

The following examples illustrate an aspect of the invention wherein blends of cationic starch derivatives and vinyl acetate emulsion polymers are substituted for protein in board coating compositions. Specifically, starch derivatives were used with either poly(vinyl acetate) or poly(vinyl acetate-ethylene) copolymer emulsions. In one example, a dual derivative hydroxypropyl starch gave surprisingly good results when used alone as a binder substitute for protein.

Example 15

This example uses a cationic dual derivative starch substituted with ethylene oxide and a quaternary ammonium compound. The starches used in this example include Apollo® 6200 starch with a nitrogen substitution of 0.29–0.35% and an ethylene oxide substitution of 0.9–1.2% by weight on dry starch; and Apollo® 4280 starch with a nitrogen substitution of 0.16–0.20% and ethylene oxide substitution of 0.9–1.2% by weight on dry starch (both from Penford Products Co.). Before the Apollo® 6200 starch could be utilized in coating compositions, it was necessary to reduce its intrinsic viscosity. The procedure for this was as follows. The granular Apollo® 6200 was slurried in water at 38% solids and placed in a 35° C. water bath. To this, 540 g of 26% NaCl solution was added as a swelling inhibitor. Then 70 g of concentrated hydrochloric acid was dripped into the slurry under agitation. The starch was thinned to a 20 g alkali fluidity measurement of 40–50 ml. The slurry was then neutralized with sodium carbonate, filtered and washed to remove the salts. The Apollo® 4280 starch was not subjected to any acid modification.

The starches were cooked at 25% solids and blended with vinyl acetate-ethylene copolymer latex (Airflex 199, Air Products) at varying polymer/starch ratios. The blends were then used to completely replace the protein in the coating composition and coated onto the precoated paperboards at a coat weight of 3.3 lbs/1000 ft², following the procedure of Example 3. Coating results can be found in Table 15. These indicate that the glueability and gloss provided by the blends are comparable to the results obtained using the protein control (Example 10). It is noted also that the Apollo® 4280 starch, which has lower nitrogen substitution than the Apollo®6200 starch, has inferior glueability.

TABLE 15

Replacement of Protein With Dual Derivative Cationic Starch-Latex Blends at Different Polymer/Starch Ratios

| Dual Derivative Cationic Starch/Vinyl Acetate-Ethylene Copolymer Blends (Polymer/Starch Ratio) | Coating Viscosity (cps) | Glueability | | Uncalendered Gloss (%) |
|---|---|---|---|---|
| | | Glue Time (min.) | Fiber Tear (%) | |
| Apollo ® 6200/Airflex 199 (100/100) | 1900 | 0.5 | 70 | 16.60 |
| | | 1 | 95 | |
| Apollo ® 6200/Airflex 199 (33/100) | 4200 | 0.5 | 45 | 16.54 |
| | | 1 | 70 | |
| Apollo ® 6200/Airflex 199 (60/100) | 3200 | 0.5 | 65 | 16.90 |
| | | 1 | 70 | |
| Apollo ® 4280/Airflex 199 (60/100) | 720 | 0.5 | 35 | 16.97 |
| | | 1 | 70 | |

Example 16

For this example, starch was derivatized with propylene oxide (Aldrich Chemical) and a quaternary ammonium compound (Quab 151, DeGussa). This dual cationic starch was used as a substitute for protein in paperboard coating compositions. A detailed procedure for the derivatization and acid modification is as follows. A salt/caustic solution was prepared by mixing 10.94 parts by volume of 0.26.% NaCl solution with 1 part 50% NaOH. This mixture was then dripped into 14.3 kg of a 40.9% starch slurry. The amount of addition calculated to give 2.22% NaOH on starch. The slurry was stirred in a 38° C. water bath. The propylene oxide was added and allowed to react in a closed system for 18 hours. The quaternary ammonium compound was then added and allowed to react for 24 hours. After this period, the reaction was terminated by neutralization with 300 g of concentrated hydrochloric acid. Enough additional acid (310 g) was added so that 10 ml of slurry filtrate would be brought to a phenolphthalein endpoint by 30 ml of 0.1N NaOH. The slurry was thinned by the acid in a 100° F water bath until a 20 g alkali fluidity of 40–50 ml was reached. It was then neutralized and the salts removed by filtration and washing. Kjeldahl analysis found 0.23–0.37% nitrogen. Propylene oxide substitution was determined to be 1.09–2.02% by Zeisel titration.

The starch was cooked at 25% solids and coated or blended with vinyl acetate-ethylene polymeric emulsions (Airflex 199 or Airflex 100, Air Products Co.) to get a 25–35% solids products,. These products were used to replace protein in paperboard coatings and coated at 3.3 lbs/1000 ft$^2$ according to the procedure of Example 3. The results are given in Table 16. The addition of the anionic surfactant dodecylbenzene sulfonic acid (DBSA) to the blend at a 3% level gave a coating superior in glueability to the protein control (Example 10).

TABLE 16

Replacement of Protein With Hydroxypropyl Cationic Starch Alone and in Blends With Vinyl Acetate-Ethylene Copolymers

| Dual Derivative Cationic Starch/Vinyl Acetate- Ethylene Copolymer Substitution of 7.8 Parts Protein With | Coating Viscosity (cps) | Glueability | | Uncalendered Gloss (%) |
|---|---|---|---|---|
| | | Glue Time (min.) | Fiber Tear (%) | |
| HP Cat. Starch*, 7.8 | 1625 | 0.5 | 50 | 17.04 |
| 4.875 HP Cat Starch 2.925 PVAc-E (Airflex 199) | 3300 | 0.5 1 | 40 85 | 17.14 |
| 4.875 HP Cat Starch 2.925 PVAc-E (Airflex 199) 0.234 DBSA | 1250 | 0.5 1 | 75 95 | 17.24 |
| 4.875 HP Cat Starch 12.925 PVAc-E (Airflex 100) | 2700 | 0.5 1 | 55 80 | 18.17 |
| 5.46 HP Cat Starch 2.34 PVAc-E (Airflex 199) | 3500 | 0.5 1 | 30 65 | 16.72 |

*HP Cat. Starch = acid thinned hydroxypropylated cationic starch.

Example 17

The blends in this example were used to replace both the protein and latex portions of the binder in paperboard coating compositions. The cationic dual derivative starch prepared in Example 16 was used in this example in conjunction with one or more latices. These include vinyl acetate-ethylene latices (Airflex 199 and Airflex 100 from Air Products Co.), a lightly thinned, lightly oxidized hydroxyethyl starch styrene-butadiene graft. (Pengloss® 150 from Penford Products Co.), and a laboratory prepared enzyme-thinned cationic starch grafted with styrenebutadiene copolymer. Boards were coated at 3.3 lbs/1000 ft$^2$ following the procedure in Example 3. Coating results are reported in Table 17. The blend using the cationic starch styrene-butadiene graft flocced the pigment and could not be coated.

TABLE 17

Replacing Both Protein and Latex Binders With Acid Thinned Hydroxypropylated Cationic Starch-Latex Blends

| Substitution of 19.85 Parts Protein With | Coating Viscosity (cps) | Glueability | | Uncalendered Gloss (%) |
|---|---|---|---|---|
| | | Glue Time (min.) | Fiber Tear (%) | |
| HP Cat. Starch 7.44 PVAc-E (Airflex 199) | 3500 | 0.5 1 | 50 75 | 14.91 |
| 4.875 HP Cat Starch 2.925 PVAc-E (Airflex 199) 12.05 PVAc-E (Airflex 100) | 1750 | 0.5 1 | 65 65 | 17.96 |
| 4.875 HP Cat Starch 2.925 PVAc-E (Airflex 199) 12.05 Cat Starch SBR graft | Flocced Clays | | | |
| 4.875 HP Cat Starch 2.925 PVAc-E (Airflex 199) 12.05 Pengloss ®150 | 1700 | 0.5 1 | 0 0 | 16.62 |

Example 18

The starch used in this example to replace protein in paperboard coating compositions is the same cationic dual derivative starch as in Example 15 (Apollo® 6200, Penford Products). The starch was thinned by enzymatic hydrolysis according to a method similar to that in Example 1 but using a lower temperature and shorter time. Specifically, 21 microliters of alpha-amylase were added to a 30% solids slurry containing 150 g dry starch. The slurry was added to a cooker containing enough water to get a 20% solids paste. The cooker was maintained at 88° C. and the time of starch addition was 4 minutes. The starch was thinned 21 minutes longer. The cooked starch was blended with vinyl acetate homopolymer (Vinac 881, Air Products) or vinyl acetate-ethylene copolymer (Airflex 100, Air Products) to make a 25% solids mixture. The blends were adjusted to a pH of 5–5.5. Boards were coated at 3.3 lbs/1000 ft$^2$ according to the procedure in Example 3. Coating results can be found in Table 18. This data shows boards coated with vinyl acetate homopolymer and vinyl acetate-ethylene copolymer perform well.

TABLE 18

Replacing Protein With the Blends of Enzyme Thinned Hydroxyethylated Cationic Starch and Latices

| Substitution of 7.8 Parts Binder With | Coating Viscosity (cps) | Glueability | | Uncalendered Gloss (%) |
|---|---|---|---|---|
| | | Glue Time (min.) | Fiber Tear (%) | |
| 4.875 Starch (Apollo ® 6200) 2.925 PVAc (Vinac 881) | 990 | 0.5 1 | 50 80 | 25.06 |
| 4.875 Starch (Apollo ® 6200) 12.925 PVAc-E (Airflex 100) | 900 | 0.5 1 | 55 80 | 25.20 |

Example 19

Starch/latex blends used in this example as a substitute for protein in paperboard coating compositions were prepared from a cationic starch, or a combination of a cationic starch and a nonionic or anionic starch. The cationic starch (Apollo® 700, Penford Products Co.), has a nitrogen substitution of 0.38–0.42% by weight on dry substance starch. The starch was acid modified as in Example 15 to 20 g alkali fluidity of 30–70 ml. It was then blended with polyvinyl acetate emulsions to make 25–30% solids products. The PVAc emulsions were either prepared in the laboratory or obtained commercially (Vinac 881, Air Products). The cooked starch paste was also blended in a 1:1 ratio with each of the following cooked starches: an acid-thinned, lightly oxidized, hydroxethyl starch (Pencote®, Penford Products Co.), an oxidized starch (Clearsol® 10, Penford Products Co.), and an acid-thinned, lightly oxidized, carboxymethylated starch (Astrogum® 3020, Penford Products Co.). These starch paste blends were then further blended with a vinyl acetate-ethylene emulsion polymer (Airflex 199, Air Products). Boards were coated at 3.3 lbs/1000 ft$^2$ according to the procedure in Example 3 with coating results shown in Table 19.

TABLE 19

Replacing Protein With Blends of Cationic Starch, Latex and Nonionic or Anionic Starch

| Substitution of 7.8 Parts Binder With | Coating Viscosity (cps) | Glueability Glue Time (min.) | Glueability Fiber Tear (%) | Uncalendered Gloss (%) |
|---|---|---|---|---|
| 4.875 Apollo ® 700 Starch | 3900 | 0.5 | 10 | 16.89 |
| 2.925 Lab Prep. PVAc | | 1 | 70 | |
| 4.875 Apollo ® 700 Starch | 3450 | 0.5 | 50 | 16.87 |
| 2.925 PVAc (Vinac 881) | | 1 | 70 | |
| 2.44 Apollo ® 700 Starch | 1550 | 0.5 | 55 | 19.71 |
| 2.44 Pencote ® | | 1 | 80 | |
| 2.92 PVAc-E (Airflex 199) | | | | |
| 2.44 Apollo ® 700 Starch | 1400 | 0.5 | 30 | 19.07 |
| 2.44 Clearsol 10 ® Starch | | 1 | 65 | |
| 2.92 PVAc-E (Airflex 199) | | | | |
| 2.44 Apollo ® 700 Starch | 2925 | 0.5 | 20 | 18.96 |
| 2.44 Astrogum ® 3020 Starch | | 1 | 85 | |
| 2.92 PVAc-E (Airflex 199) | | | | |

Example 20

The starch used in this example to replace protein in paperboard coating compositions is the same cationic starch used in Example 19 (Apollo®700, Penford Products Co.). It was enzyme-thinned in the same manner as in Example 18. The enzyme-thinned starch paste was blended with a vinyl acetate-ethylene copolymer emulsion (Airflex 199, Air Products) at different starch/polymer ratios, and coated on precoated boards at 3.3 lbs/1000 ft$^2$ following the procedure in Example 3. Results in Table 20 show little difference in properties when the starch/emulsion polymer ratio is altered.

TABLE 20

Variation of the Starch/Latex Ratio

| Substitution of 7.8 Parts Binder With | Coating Viscosity (cps) | Glueability Glue Time (min.) | Glueability Fiber Tear (%) | Uncalendered Gloss (%) |
|---|---|---|---|---|
| 3.9 Starch (Apollo ® 700) | 2350 | 0.5 | 30 | 24.34 |
| 3.9 PVAc-E (Airflex 199) | | 1 | 60 | |
| 4.875 Starch (Apollo ® 700) | 2250 | 0.5 | 25 | 23.14 |
| 2.925 PVAc-E (Airflex 199) | | 1 | 60 | |

Example 21

In this example, the cationic dual derivative starch of Example 16 was blended with a synthetic latex and used as a total replacement for the protein binder in paperboard coating compositions for both the base coat and the top coat. The starch was cooked at 20% solids and blended with a vinyl acetate-ethylene copolymer emulsion (Airflex 199, Air Products Co.). The blend was applied to uncoated natural kraft paperboard in two coatings. The base coating color had the following composition:

| Material | Dry Parts |
|---|---|
| Conventional Clay (Astracote 90) | 100 |
| SBR Latex (Dow 620) | 18.29 |
| Protein or Substitute | 3.66 |
| Tetrasodiumpyrophosphate | 0.12 |
| Dispersant (Colloids 211) | 0.11 |
| Biocide (Metasol D3T) | 0.02 |
| Final coating solids | 58% |
| pH of coating color (with NH$_4$OH) | 9.0–9.4 |
| Ammonium zirconium carbonate (Bacote 20) | 3.46 (as is) |

The top coating color was described in Example 3. The paperboard was first coated with a base coating composition at a level of 2.7 pounds/1000 ft$^2$. It was dried for one minute in an infrared drying oven. The top coating composition was then applied at 3.3 lbs/1000 ft$^2$ according to the procedure in Example 3. Coating results are shown in Table 21.

TABLE 21

Replacement of Protein Binder in Both Coatings

| Sample | Coating Visc. (cps) Base | Coating Visc. (cps) Top | Glueability Glue Time (min.) | Glueability Fiber Tear (%) | Uncalendered Gloss (%) |
|---|---|---|---|---|---|
| Protein (Control) | 1025 | 520 | 0.5 | 0 | 16.70 |
| | | | 1 | 65 | |
| Starch/PVAc-E 5.0/3.0 Ratio | 750 | 130 | 0.5 | 15 | 19.37 |
| | | | 1 | 70 | |
| Starch/PVAc-E 7.0/3.0 Ratio | 335 | 220 | 0.5 | 10 | 19.21 |
| | | | 1 | 85 | |
| Starch/PVAc-E 3.0/3.0 Ratio | 1000 | 120 | 0.5 | 5 | 20.46 |
| | | | 1 | 65 | |

Numerous modifications and variations of the above-described invention are expected to occur to those of skill in the art. Accordingly, only such limitations as appear in the appended claims should be appended thereon.

What is claimed is:

1. A method of coating paperboard comprising the step of applying to said paperboard a board coating composition comprising:
   (a) pigment; and
   (b) a binder wherein said binder comprises the polymerization reaction product of cationic starch and vinyl acetate monomer.

2. The method of claim 1 wherein said binder comprises the product of a persulfate ion initiated reaction.

3. A method of coating paperboard comprising the step of applying to said paperboard a board coating composition comprising:
   (a) pigment; and
   (b) a binder comprising the polymerization product of a cationic starch and a vinyl acetate product wherein the weight ratio of the vinyl acetate component to the cationic starch component is from about 20:100 to about 300:100.

4. A method of coating paperboard comprising the step of applying to said paperboard a board coating composition comprising:
   (a) pigment; and
   (b) a binder comprising the polymerization product of a cationic starch and a vinyl acetate product wherein the board coating composition is applied to said paperboard at a level of from about 0.5 to about 10 pounds per 1000 square feet per side.

* * * * *

UNITED STATES PATENT AND TRADEMARK OFFICE
CERTIFICATE OF CORRECTION

PATENT NO. : 5,536,764

DATED : July 16, 1996

INVENTOR(S) : Nguyen et al.

It is certified that error appears in the above-identified patent and that said Letters Patent is hereby corrected as shown below:

On the title page, item [63],
Related U.S. Application Data, "Continuation of Ser. No. 901,073, Jun. 19, 1992, Pat No. 5,360,846" should be "Continuation of Ser. No. 901,073, Jun. 19, 1992."

Column 1, line 5, "now U.S. Pat. No. 5,360,846" should be deleted.

Column 3, line 9, "styrenebutadiene" should be --styrene-butadiene--.

Column 12, Table 3, Sample E.T. Apollo® 500/Vinyl Acetate Graft, 60/100, delete "1.5" at the Coat Wt. (lbs/1000 ft$^2$) column.

Column 12, Table 3, Sample E.T. Apollo® 500/Vinyl Acetate Graft, 60/100, "65" should be --1.5-- at the Glue Time (min.) column.

Column 12, Table 3, Sample E.T. Apollo® 500/Vinyl Acetate Graft, 60/100, insert --65-- under "50" at the % Fiber Tear column.

Column 13, Table 3, Sample "E.T. Astro®X-Vinyl Acetate Graft 100/100" should be --E.T. Astro® X-50/Vinyl Acetate Graft 100/100-- and insert --17.5-- at the Uncalendered Gloss (%) column.

Column 21, Table 5-B, Sample Amphoteric VII, "961" should be --969-- at the Particle Size (nm) column.

Column 23, line 28, "the" should be --The--.

UNITED STATES PATENT AND TRADEMARK OFFICE
CERTIFICATE OF CORRECTION

PATENT NO. : 5,536,764

DATED : July 16, 1996

INVENTOR(S) : Nguyen et al.

It is certified that error appears in the above-identified patent and that said Letters Patent is hereby corrected as shown below:

Column 23, line 30, "Appollo®" should be --Apollo®--.

Column 27, line 33, "alph-amylase" should be --alpha-amylase--.

Column 30, Table 9-B, Sample Butyl acrylate at 3%, "26" should be --26.5-- at the Uncalendered Gloss (%) column.

Column 37, Table 16, the heading "Dual Derivative Cationic Starch/Vinyl Acetate-Ethylene Copolymer Substitution of 7.8 Parts Protein With" should be --Substitution of 7.8 Parts Protein With--.

Column 37, Table 16, Substitution of 7.8 Parts Protein With HP Cat. Starch*, 7.8, insert --1-- under "0.5" at the Glue Time (min.) column and insert --75-- under "50" at the Fiber Tear (%) column.

Column 37, Table 16, at Substitution of 7.8 Parts Protein With, "12.925 PVAc-E (Air-flex 100)" should be --2.925 PVAc-E (Air-flex 100)--.

Column 38, Table 17, line 10, at Substitution of 19.85 Parts Protein With, "HP Cat. Starch" should be --12.41 HP Cat. Starch--.

UNITED STATES PATENT AND TRADEMARK OFFICE
CERTIFICATE OF CORRECTION

PATENT NO. : 5,536,764

DATED : July 16, 1996

INVENTOR(S) : Nguyen et al.

It is certified that error appears in the above-identified patent and that said Letters Patent is hereby corrected as shown below:

Column 38, Table 18, line 61, at Substitution of 7.8 Parts Binder With, "12.925 PVAc-E (Air-flex 100)" should be --2.925 PVAc-E (Air-flex 100)--.

Signed and Sealed this

Twenty-ninth Day of April, 1997

Attest:

BRUCE LEHMAN

Attesting Officer

Commissioner of Patents and Trademarks